(12) United States Patent
Katsuyama

(10) Patent No.: US 6,917,706 B2
(45) Date of Patent: Jul. 12, 2005

(54) RULED LINE EXTRACTING APPARATUS FOR EXTRACTING RULED LINE FROM NORMAL DOCUMENT IMAGE AND METHOD THEREOF

(75) Inventor: Yutaka Katsuyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 643 days.

(21) Appl. No.: 09/755,030

(22) Filed: Jan. 8, 2001

(65) Prior Publication Data

US 2001/0002215 A1 May 31, 2001

Related U.S. Application Data

(62) Division of application No. 08/909,137, filed on Aug. 11, 1997, now Pat. No. 6,226,402.

(30) Foreign Application Priority Data

Dec. 20, 1996 (JP) ............................................ 08-342185

(51) Int. Cl.[7] ................................................. G06K 9/34
(52) U.S. Cl. ......................... 382/173; 382/199; 382/202
(58) Field of Search ................................. 382/165, 170, 382/171, 173, 176, 175, 177, 199, 202, 224, 282, 284, 286, 290; 358/453, 462, 464, 538; 715/509, 510

(56) References Cited

U.S. PATENT DOCUMENTS

| | | | | |
|---|---|---|---|---|
| 4,933,984 A | * | 6/1990 | Nakano et al. | ............. 382/175 |
| 5,048,107 A | * | 9/1991 | Tachikawa | .................. 382/173 |
| 5,101,448 A | | 3/1992 | Kawachiya et al. | |
| 5,129,012 A | | 7/1992 | Abe | |
| 5,191,612 A | | 3/1993 | Katsuyama et al. | |
| 5,231,579 A | | 7/1993 | Tsuchiya et al. | |
| 5,572,602 A | | 11/1996 | Naoi et al. | |
| 5,757,957 A | | 5/1998 | Tachikawa | .................. 382/176 |
| 5,778,103 A | | 7/1998 | Allan et al. | |
| 5,898,795 A | * | 4/1999 | Bessho | ....................... 382/173 |

FOREIGN PATENT DOCUMENTS

| | | | |
|---|---|---|---|
| JP | 2-138674 | 5/1990 | |
| JP | 5-233873 | 9/1993 | ............ G06K/9/20 |
| JP | 7-5740 | 1/1995 | ........... G03G/15/01 |
| JP | 8-77294 | 3/1996 | |

OTHER PUBLICATIONS

Communication (the Notice of Grounds for Rejection) for the corresponding Japanese Patent Application.
T. Saitoh, "Document Image Segmentation and Layout Analysis", IEICE Transactions on Information and Systems, No. 7, Jul. 1994, pp. 778–784.
B. Yu, "A Generic System for Form Dropout", IEEE, vol. 18, No. 11, Nov. 1996, pp. 1127–1134.
A. Yu, "A Generic System for Form Dropout", IEEE, vol. 18, No. 11, Nov. 1996, pp. 1127–1134.
Sawaki et al., Text–line Extraction and Character Recongnize of Japanese Newspaper Headlines with Graphics Designs, Aug. 25–29, 1996, IEEE, Proceedings of the 13th International Conference on Pattern Recognition, 1996, pp. 73–78, vol. 3.
Japanese Patent Office Communication dated Mar. 30, 2004 corresponding to Japanese Patent Appl. No. 9–346850.

* cited by examiner

Primary Examiner—Timothy M. Johnson
(74) Attorney, Agent, or Firm—Staas & Halsey LLP

(57) ABSTRACT

A ruled line extracting apparatus obtains circumscribed rectangles of pixel concatenation regions included in an input pattern, and calculates the most frequent value of their heights. Additionally, the apparatus integrates segments by ignoring a wild card segment, and calculates the most frequent value of height/width of extracted straight lines and segments structuring the straight line. Next, it performs a process for integrating/deleting straight lines using each threshold value based on the highest frequency value. Then, it checks/deletes a straight line according to a distribution of black pixels around the straight line, and recognizes the remaining straight lines as ruled line candidates.

10 Claims, 50 Drawing Sheets

| 番号 | 項目名称 | 内容 | 値 |
|---|---|---|---|
| 0001 | 富士通株式会社 | 手車各業界及び取手<br>応等車項目等情報 | 川崎市中原区上小田中 |
| 0002 | 株式会社富士通<br>研究所 | 該車及び業界面状<br>況等情報状況 | 川崎市中原区上小田中 |
| 0003 | | 手車各業界及び取手<br>応等車項目等情報 | 石川県河北郡ノ気 |
| 0004 | その他 | 一般車使用目出及び<br>一般車両関行且のの<br>等関連入 | |

FIG. 1C

| FREQUENCY | MAXIMUM HEIGHT |
|---|---|
| 2 | 15 |
| 7 | 10 |
| 12 | 9 |
| 19 | 8 |

| 外往分 | SWNH T 題 | 社内 社外 区分 | 信願 開始 日 西暦 | 信願 終了 日 西暦 | H 数 | 拙機器 種別 | 区分 | 形態 | 時間 H | 種別(注2) 曲直接 内容 放送 分 | プログラム ソース タイプ | その 他 | 発 注 日 西暦 | 検 収 日 西暦 |
|---|---|---|---|---|---|---|---|---|---|---|---|---|---|---|
| O | BD~ DD | 社外 社内 | 96 4 1 | 5 /20 | 2 | | | | 100 | A 20 | | | | |

FIG. 34

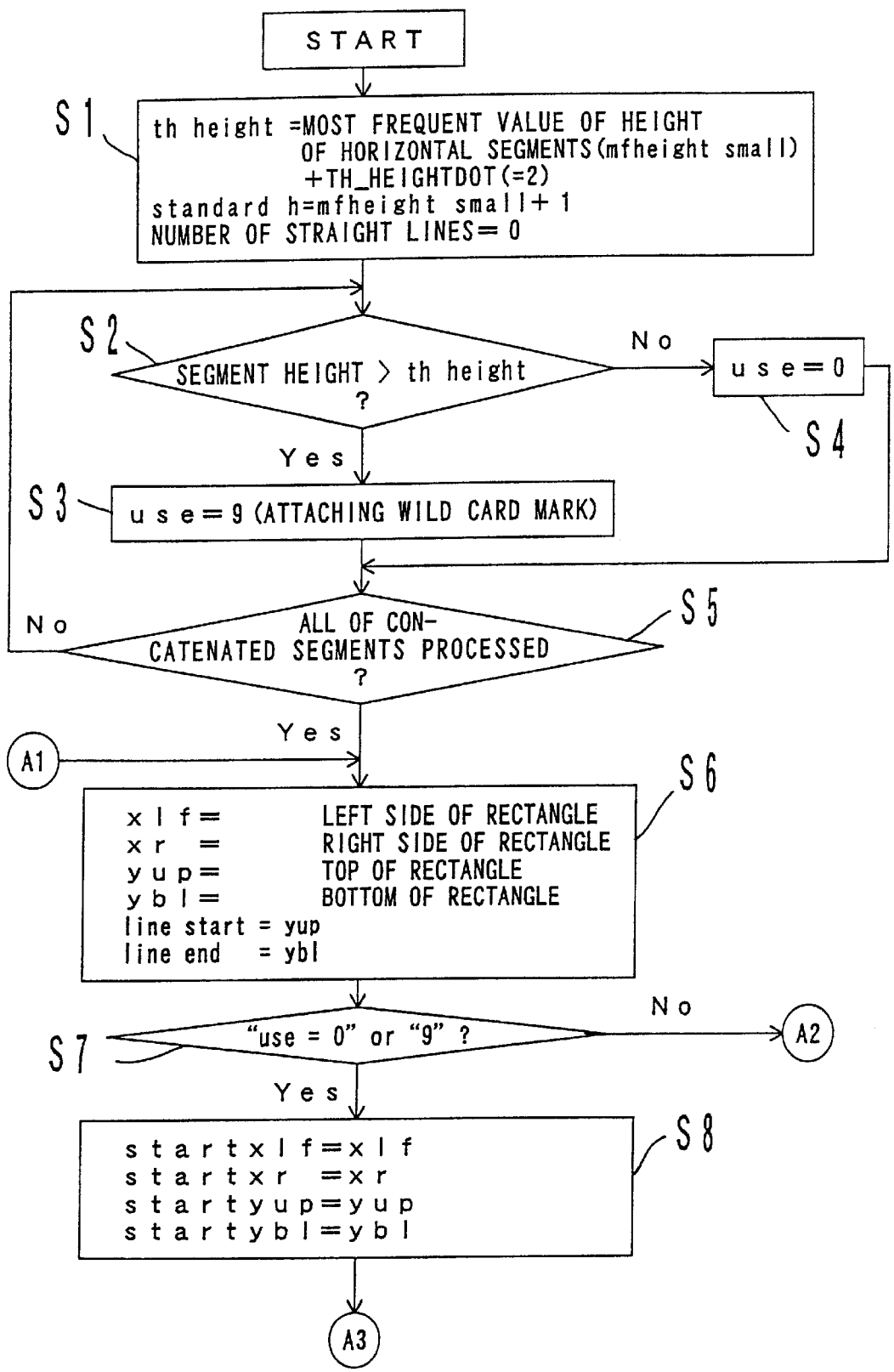
F I G. 3 7

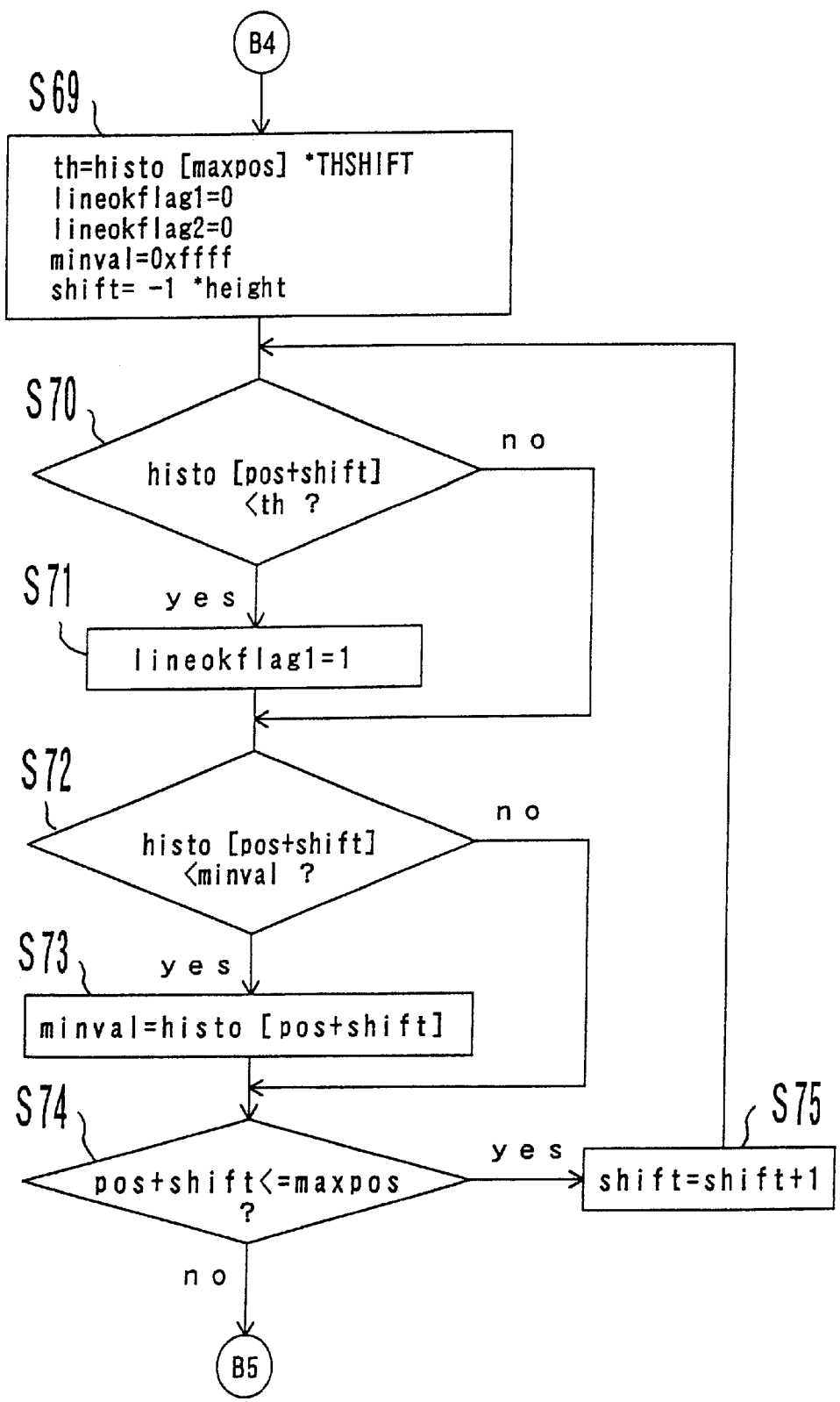
F I G. 45

RULED LINE EXTRACTING APPARATUS FOR EXTRACTING RULED LINE FROM NORMAL DOCUMENT IMAGE AND METHOD THEREOF

CROSS-REFERENCE TO RELATED APPLICATION

This application is a division of application Ser. No. 08/909,137, filed Aug. 11,1997, now U.S. Pat. No. 6,226,402.

BACKGROUND OF THE INVENTION

1. Field of the Invention

The present invention relates to a ruled line extracting apparatus for extracting a ruled line portion from an arbitrary document image read by a photoelectric converter, etc., and method thereof.

2. Description of the Related Art

In recent years, the demand for an electronic filing system which converts a paper document into an electronic form, and stores it on an optical disc, etc., has increased, in order to improve the efficiency of operations performed within a company. With a conventional electronic filing system, a paper document is converted into an image by a photoelectric converter such as an image scanner, etc., and the image with a search keyword attached is stored on an optical disc or on a hard disk. However, since the keyword must be input from a keyboard, the input operation is troublesome.

As a former application by the present applicant in order to overcome this troublesome operation, "Title Extracting Apparatus for Extracting Title from Document Image and Method Thereof, U.S. patent application Ser. No. 08/694,503, Japanese patent application H7-341983" can be referred to. With this method, a document title included in an image is automatically extracted and registered as a keyword. Additionally, management information such as a title, destination, transmitting source etc., can be automatically extracted from various document images including a table format document. For example, it is proved that a title outside a table can be extracted with approximately 90% accuracy.

A title inside a table, however, can be extracted with only 55% accuracy, which is insufficient to be put into practical use. To extract a keyword such as a title from inside a table with high accuracy, ruled lines structuring the table must be accurately extracted. The technique for extracting a ruled line has been developed mainly for a spreadsheet in which characters, etc. are regularly lined up.

As the conventional techniques for extracting a ruled line, "Image Extracting Method" (Japanese patent laid-open H6-309498) and "Image Extracting Apparatus" (Japanese patent laid-open H7-28937) can be referred to. With these techniques, a frame can be extracted or removed without requiring an input of information such as a frame position etc., in a spreadsheet. A spreadsheet which can be processed is a sheet composed of one-character frames, block frames (horizontal one-line frames, or free format frames), or a sheet having a structure in which the shape of a frame is rectangular, and horizontal frame lines are regularly arranged.

Additionally, as the techniques for extracting a ruled line according to former applications in Japan by the present applicant, "Frame Extracting Apparatus and Rectangle Extracting Apparatus" (Japanese patent application H7-203259), "Pattern Area Extracting Apparatus and Pattern Extracting Apparatus" (Japanese patent application H7-282171), and "Pattern Extracting Apparatus and Pattern Area Extracting Method" (Japanese patent application H8-107568) can be referred to.

With these techniques, a frame can be extracted/removed even if the outer periphery of frames is rectangular as shown in FIG. 1A, or not rectangular as shown in FIG. 1B. Furthermore, the frame of a table structured by a rectangle which is surrounded by a frame, and partitioned into smaller portions, can also be extracted and removed, like the shaded portion shown in FIG. 1B. Provided below is the outline of this process.

(1) thinning: With a mask process, horizontal and vertical segments are made thinner, and the difference between the thickness of a character and that of a frame is eliminated.

(2) segment extraction: a relatively long straight line is extracted with the adjacency projection method according to the "Image Extracting Method" (Japanese patent laid-open H6-309498). The adjacency projection method is a method for recognizing the result of adding the projection value of pixels included in rows or columns around a specific row or column, to the projection value of pixels in the specific row or column, as the final projection value of the specific row or column. With this method, pixel distribution around a particular row or column can be globally identified.

(3) straight line extraction: extracted segments are sequentially searched, and it is examined whether or not there is an empty space of a predetermined length between segments. If there is no such empty space, the segments are sequentially linked, so that a long straight line is extracted.

(4) straight line integration: extracted straight lines are again integrated. Straight lines separated into two or more portions due to a blur are integrated into one straight line.

(5) straight line extension: a straight line which is made shorter due to a blur is extended, and restored to its original length, only when a spreadsheet is proved to be regular.

However, the above described techniques have the following problems.

According to the techniques disclosed in the former applications, whether the shape of a frame of a spreadsheet is regular or irregular, it can be processed as long as it is a table frame composed of rectangular regions. Whether a ruled line to be targeted is a solid or dotted line, it can be processed regardless of the existence of a blur. Furthermore, a straight line which is made shorter due to an extreme blur is extended only when a table is proved to be regular.

A normal input image may sometimes include characters of a thick font, or a shaded portion in a table, as shown in FIG. 1C. In such a case, a ruled line is erroneously extracted from a defaced character string in which characters touch one another, and ruled lines which are erroneously extracted may sometimes be integrated with correct ruled lines.

Additionally, a ruled line which touches a group of black pixels such as a shaded portion, or a ruled line which touches a character cannot be extracted. To overcome these problems, it is desirable that a table document such as a spreadsheet whose ruled-line structure is known beforehand should be a process target.

However, since it is unknown beforehand what type of table a normal document handled by electronic filing includes, the probability that various images including a defaced character etc., are input, is high. Accordingly, a ruled-line is not necessarily and correctly extracted according to the techniques of the former applications as they are.

SUMMARY OF THE INVENTION

An object of the present invention is to provide a ruled line extracting apparatus and method thereof, which allow a ruled line portion to be extracted from a normal document image whose ruled-line structure cannot be predicted.

The ruled-line extracting apparatus according to the present invention comprises an estimating unit, storing unit, segment extracting unit, calculating unit, straight line extracting unit, graph generating unit, straight line processing unit, straight line integrating unit and a straight line deleting unit.

In a first aspect of the present invention, the estimating unit estimates the size of a standard pattern included in an input image; and the straight line extracting unit sets a threshold value based on the information about the size of the standard pattern, and extracts the information of one or more straight line patterns from the input image using the threshold value.

In a second aspect of the present invention, the straight line extracting unit extracts the information about one or more straight line patterns from an input image; the calculating unit obtains a representative value of the sizes of the one or more straight line patterns; and the straight line processing unit sets a threshold value based on the representative value, and processes the information of the one or more straight line patterns using the threshold value.

In a third aspect of the present invention, the straight line extracting unit extracts the information of one or more straight line patterns from an input image; the calculating unit obtains a representative value of the sizes of one or more segment patterns structuring the one or more straight line patterns; and the straight line processing unit sets a threshold value based on the representative value, and processes the information of the one or more straight line patterns using the threshold value.

In a fourth aspect of the present invention, the segment extracting unit extracts the information of one or more segment patterns from an input image; the storing unit classifies the information of one or more segment patterns into the information of a large segment pattern and the information of a small segment pattern, and stores them; and the straight line extracting unit examines a link state of the one or more segment patterns, and, when a large segment pattern is linked to small segment patterns, extracts a straight line pattern composed of the small segment patterns regardless of the size of the large segment pattern.

In a fifth aspect of the present invention, the straight line extracting unit extracts the information about one or more straight line patterns from an input image; and the straight line integrating unit integrates two straight line patterns, included in the one or more straight line patterns, into one, if they almost overlap.

In a sixth aspect of the present invention, the straight line extracting unit extracts the information of one or more straight line patterns from an input image; and the straight line deleting unit determines whether or not to delete one of the straight line patterns using at least either of the information about the shape of one pattern among the one or more straight line patterns, and the information about a distance between two straight line patterns included in the one or more straight line patterns.

In a seventh aspect of the present invention, the straight line extracting unit extracts the information of one or more straight line patterns from an input image; and the straight line deleting unit determines whether or not to delete either of a horizontal straight line pattern and a vertical straight line pattern included in the one or more straight line patterns based on a link relationship between these patterns.

In an eighth aspect of the present invention, the straight line extracting unit extracts the information of one or more straight line patterns from an input image; and the straight line deleting unit deletes a shorter pattern of two straight line patterns which almost overlap, and included in the one or more straight line patterns.

In a ninth aspect of the present invention, the straight line extracting unit extracts the information of one or more straight line patterns from an input image; the straight line integrating unit recognizes an integrated straight line pattern as a ruled line candidate when the size of the straight line pattern, generated by integrating two straight line patterns which partially overlap, and included in the one or more straight line patterns, becomes approximately a predetermined value.

In a tenth aspect of the present invention, the straight line extracting unit extracts the information of one or more straight line patterns from an input image; and the straight line deleting unit deletes a straight line pattern composed of segment patterns larger than a threshold value among the one or more straight line patterns.

In an eleventh aspect of the present invention, the straight line extracting unit extracts the information of a straight line pattern from an input image; the graph generating unit obtains the number of pixels included in a segment pattern of a standard size among one or more segment patterns structuring the straight line pattern, and generates a graph representing the number of pixels around the straight line pattern; and the straight line deleting unit determines whether or not to delete the straight line pattern based on the shape of the graph.

BRIEF DESCRIPTION OF THE DRAWINGS

FIG. 1C shows a table frame from which a ruled line is difficult to be extracted;

FIG. 8 shows a table of rectangle heights;

FIG. 25 is a schematic diagram showing an image after a process for integrating horizontal segments is performed;

FIG. 31 shows an image before a process for deleting a straight line which almost completely overlaps is performed;

FIG. 32 shows an image after the process for deleting a straight line which almost completely overlaps, is performed;

FIG. 33 shows an image before the process for deleting a straight line composed of only large segments, is performed;

FIG. 34 shows an image after the process for deleting a straight line composed of only large segments, is performed;

FIG. 37 is a flowchart 1 showing the process for integrating segments;

FIG. 45 is a flowchart 4 showing the process for checking/deleting a straight line;

DESCRIPTION OF THE PREFERRED EMBODIMENT

Figure 1A:
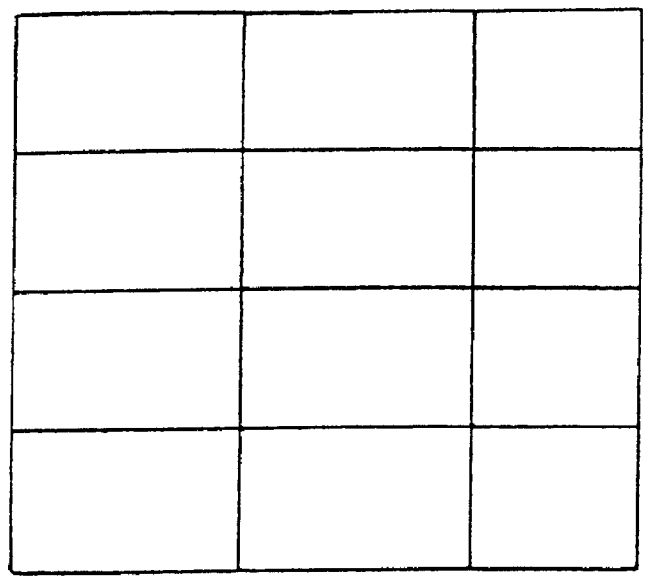
FIG. 1A shows a simple table frame.
Figure 1B:
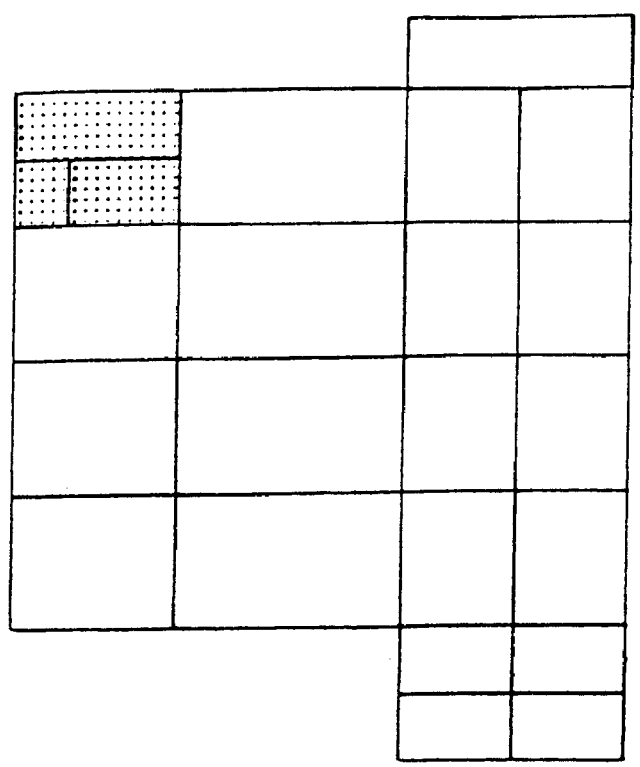
FIG. 1B shows a complicated table frame.

Provided below is the explanation about the details of the preferred embodiment according to the present invention, by referring to the drawings.

Figure 2A:
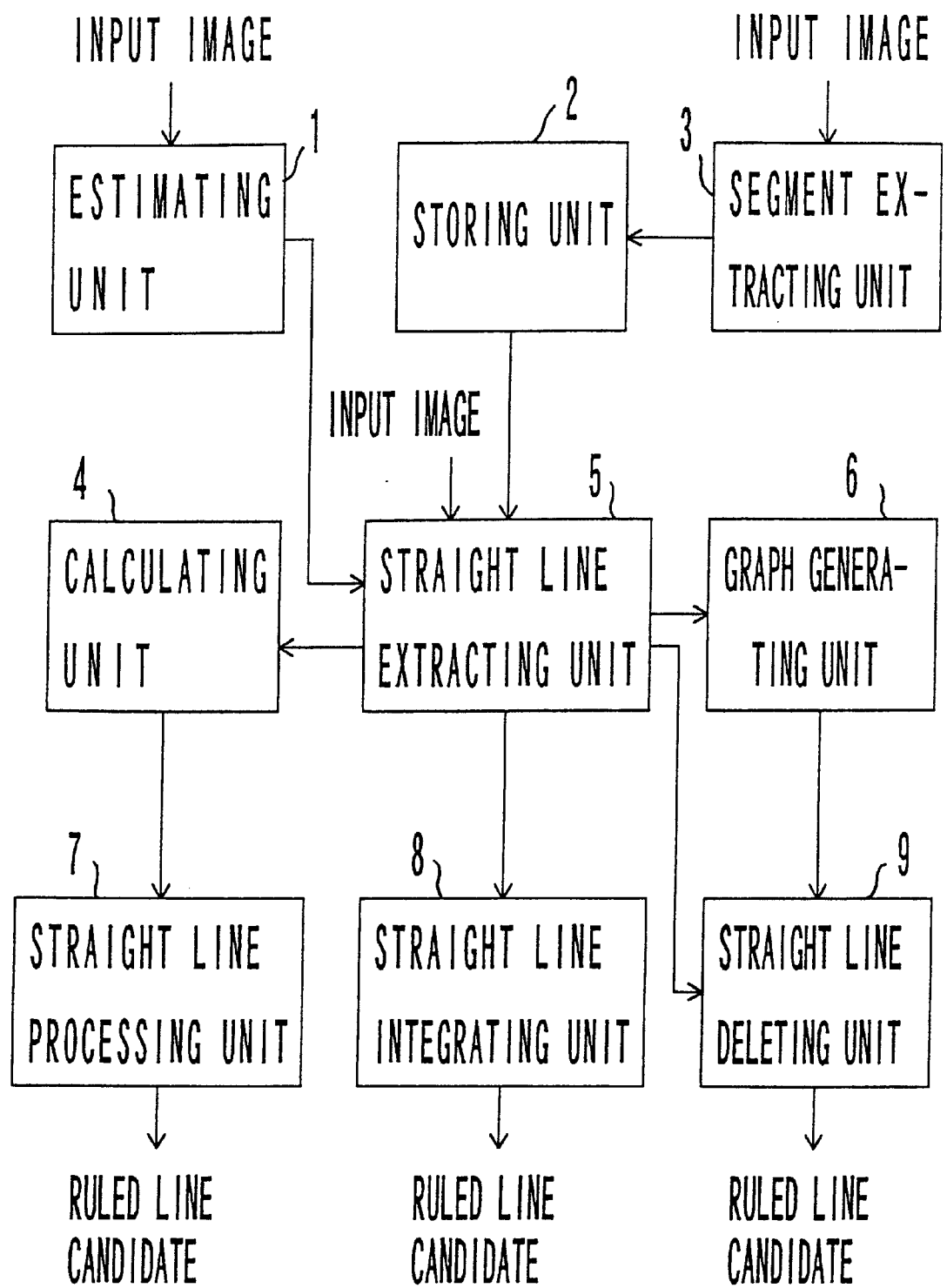
FIG. 2A is a block diagram showing the principle of a ruled line extracting apparatus according to the present invention.

FIG. 2A is a block diagram showing the principle of a ruled line extracting apparatus according to the present invention. The ruled line extracting apparatus shown in FIG. 2A includes the first, second, third, fourth, fifth, sixth, seven, eighth, ninth, tenth and eleventh principles, and comprises an estimating unit 1, storing unit 2, segment extracting unit 3, calculating unit 4, straight line extracting unit 5, graph generating unit 6, straight line processing unit 7, straight line integrating unit 8 and a straight line deleting unit 9.

According to the first principle, the estimating unit 1 estimates the size of a standard pattern included in an input image. The straight line extracting unit 5 sets a threshold value based on the information about the size of the standard pattern, and extracts the information of one or more straight line patterns from the input image using the threshold value.

The standard pattern corresponds to a pattern of a character or the like of a standard size, which appears most often in an input image. For example, a pixel concatenation region representing a character is used as the standard pattern. For example, the height or the width of a rectangle circumscribed about that region is used as the size information.

A straight line pattern corresponds to a horizontally or vertically long pattern extracted from an input image by a mask process using a horizontally or vertically long mask, and a segment integration process. The information of a straight line pattern includes, for example, coordinate values of a rectangle which circumscribes a plurality of segment patterns structuring the straight line pattern. The segment pattern corresponds to a pixel region in a segment shape, which is extracted from an image by the mask process.

The straight line extracting unit 5 determines each of threshold values based on the size of the standard pattern, and classifies straight line patterns in an image based on the threshold values. With this process, a straight line pattern deriving from a shaded portion or a character which touches another character, etc. is excluded from ruled line candidates, and a correct ruled line candidate can be extracted.

According to the second principle, the straight line extracting unit 5 extracts the information of one or more straight line patterns from an input image; the calculating unit 4 obtains the representative value of the sizes of the one or more straight line patterns. The straight line processing unit 7 sets a threshold value based on the representative value, and processes the information of the one or more straight line patterns using the threshold value.

The calculating unit 4 obtains the representative size of straight line patterns, for example, based on a histogram of heights or widths of a plurality of straight line patterns. The straight line processing unit 7 performs the operations such as setting a threshold value close to the representative value, and excluding a straight line pattern whose size is larger than the threshold value, etc., thereby extracting a correct ruled line candidate.

According to the third principle, the straight line extracting unit 5 extracts the information of one or more straight line patterns from an input image. The calculating unit 4 obtains the representative value of the sizes of one or more segment patterns structuring the one or more straight line patterns. The straight line processing unit 7 sets a threshold value based on the representative value, and processes the information of the one or more straight line patterns using the threshold value.

A segment pattern corresponds to a pixel region in a segment shape, which is extracted from an image by the mask process, as described above. The calculating unit 4 obtains the representative size of segment patterns, for example, based on a histogram of the heights or widths of a plurality of segment patterns. The straight line processing unit 7 can extract a correct ruled line candidate by performing the operations such as excluding a straight line pattern composed of only segment patterns whose sizes are larger than the threshold value based on the representative value.

According to the fourth principle, the segment extracting unit 3 extracts the information of one or more segment patterns from an input image. The storing unit 2 classifies the information of one or more segment patterns into the information of a large segment pattern and the information of a small segment pattern, and stores them. The straight line extracting unit 5 examines a link state of the one or more segment patterns, and, when a large segment pattern is linked to small segment patterns, extracts a straight line pattern composed of the small segment patterns regardless of the size of the large segment pattern.

The information of a segment pattern includes, for example, the coordinate values of a rectangle which circumscribes a segment pattern, etc.

The storing unit 2 attaches, for example, particular attribute information to the information of a segment pattern whose size is larger than an appropriate threshold value, makes a distinction between the information of the large segment pattern and the information of a small segment pattern, and stores the results. The straight line extracting unit 5 ignores a large segment pattern and suitably links small segment patterns on both sides of the large segment pattern, for example, when it integrates a plurality of segment patterns which overlap and extracts a rectangle which circumscribes the patterns as a straight line pattern.

With this process, from an image including a ruled line which contacts a large pixel region such as a shaded portion, character, etc., a straight line pattern which is not affected by the size of that region can be extracted as a correct ruled line candidate.

According to the fifth principle, the straight line extracting unit 5 extracts the information of one or more straight line patterns from an input image. The straight line integrating unit 8 integrates two straight line patterns included in the one or more straight line patterns into one, if they almost overlap.

The straight line integrating unit 8 reduces redundant straight line information by integrating two straight line patterns which almost overlap, thereby extracting a correct ruled line candidate.

According to the sixth principle, the straight line extracting unit 5 extracts the information of one or more straight line patterns from an input image. The straight line deleting unit 9 determines whether or not to delete one among the one or more straight line patterns using at least either of the information about the shape of one pattern among the one or more straight line patterns, and the information about a distance between two straight line patterns included in the one or more straight line patterns.

The straight line deleting unit 9 determines the degree of likeliness of a ruled line of a straight line pattern, and deletes a straight line pattern which does not look like a ruled line. With this process, a straight line pattern deriving from a shaded portion or a defaced character string, etc. is excluded from ruled line candidates, and a correct ruled line candidate can be extracted.

According to the seventh principle, the straight line extracting unit 5 extracts the information of one or more straight line patterns from an input image. The straight line deleting unit 9 determines whether or not to delete either of a horizontal straight line pattern and a vertical straight line pattern included in the one or more straight line patterns, based on the link relationship between the horizontal straight line pattern and the vertical straight line pattern.

The straight line deleting unit 9 excludes, for example, a vertical straight line pattern which does not touch any horizontal straight line pattern, and a horizontal straight line pattern which does not touch any vertical straight line, from ruled line candidates. With this process, a straight line pattern deriving from a defaced character string, etc. can be excluded from ruled line candidates, and a correct ruled line candidate can be extracted.

According to the eighth principle, the straight line extracting unit 5 extracts the information of one or more straight line patterns from an input image. The straight line deleting unit 9 deletes a shorter pattern among two straight line patterns which almost overlap, and included in the one or more straight line patterns.

The straight line deleting unit 9 reduces redundant straight line information by deleting a shorter pattern of two straight line patterns which almost overlap, thereby extracting a correct ruled line candidate.

According to the ninth principle, the straight line extracting unit 5 extracts the information of one or more straight line patterns from an input image. If the size of a straight line pattern generated by integrating two straight line patterns which partially overlap among the one or more straight line patterns, becomes approximately a predetermined value, the straight line integrating unit 8 recognizes the straight line pattern after being integrated as a ruled line candidate.

If the thickness of a straight line pattern to be generated by integrating two straight line patterns is approximately the representative thickness of straight line patterns, the straight line integrating unit 8 performs its integration process. As a result, redundant straight line information can be reduced, thereby extracting a correct ruled line candidate.

According to the tenth principle, the straight line extracting unit 5 extracts the information of one or more straight line patterns from an input image. The straight line deleting unit 9 deletes a straight line pattern composed of segment patterns whose sizes are larger than a threshold value among the one or more straight line patterns.

The straight line deleting unit 9 excludes, for example, a straight line pattern composed of only segment patterns whose thicknesses are much more than the representative thickness of segment patterns, from ruled candidates. With this process, a straight line pattern deriving from a defaced character string, etc. is excluded from ruled line candidates, thereby extracting a correct ruled line candidate.

According to the eleventh principle, the straight line extracting unit 5 extracts the information of a straight line pattern from an input image. The graph generating unit 6 obtains the number of pixels included in a segment pattern of a standard size among one or more segment patterns structuring the straight line pattern, and generates a graph representing the number of pixels in the neighborhood of the straight line pattern. The straight line deleting unit 9 determines whether or not to delete the straight line pattern based on the shape of the graph.

The graph generating unit 6 generates, for example, a set of segment patterns of a standard size by excluding a large segment pattern from a set of segment patterns structuring a straight line pattern. Then, the graph generating unit 6 shifts it to the region around the straight line pattern, and generates a graph representing the relationship between the amount of shift and the number of pixels. Furthermore, if the shape of the graph is gentle and the maximum value is unclear, the straight line deleting unit 9 deletes the straight line pattern from ruled line candidates.

For a straight line pattern extracted from the inside of a shaded portion or a defaced character string, pixels often exist all around the straight line pattern. In such a case, the shape of the graph becomes gentle, and the straight line pattern is excluded from ruled line candidates. As a result, a correct ruled line candidate can be extracted.

For example, the storing unit 2 shown in FIG. 2A corresponds to a memory 32 shown in FIG. 3, to be described later. The estimating unit 1, segment extracting unit 3, calculating unit 4, straight line extracting unit 5, graph generating unit 6, straight line processing unit 7, straight line integrating unit 8 and the straight line deleting unit 9 correspond to a CPU (Central Processing Unit) 31 and the memory 32.

Currently, a form learning system of a table format document has been developed in order to automatically extract a keyword such as a title from a table, etc. with high accuracy. With this system, a document including a table is registered beforehand, and thereafter a correct keyword can be extracted from the registered document with high accuracy. The present invention can be applied in order to correctly extract a ruled line from a document image, when the form of a table format document is learned.

The present invention, which improves the technique for extracting a ruled line in a spreadsheet according to the conventional technique or techniques in former applications, makes a distinction between a straight line extracted from an original ruled line and a straight line erroneously extracted from a character string by taking full advantage of the information of small segments structuring a ruled line. As a result, a ruled line can be correctly extracted even if a character touches a ruled line.

Furthermore, even if there is a segment extracted from a defaced portion of a table, ruled line candidates are obtained by targeting only segments extracted from an original ruled line. Then, a correct ruled line is extracted based on the shape and position relationship of a ruled line, and the distribution state of black pixels in a segment of the ruled line.

The following embodiment targets a document in which various characters exist such as a character touching a frame, or a character beyond a frame, when there is one or a plurality of frames such as a frame whose size, position, or slope is unknown. Now, we shall consider the case in which a frame is extracted from such a document image.

Figure 2B:
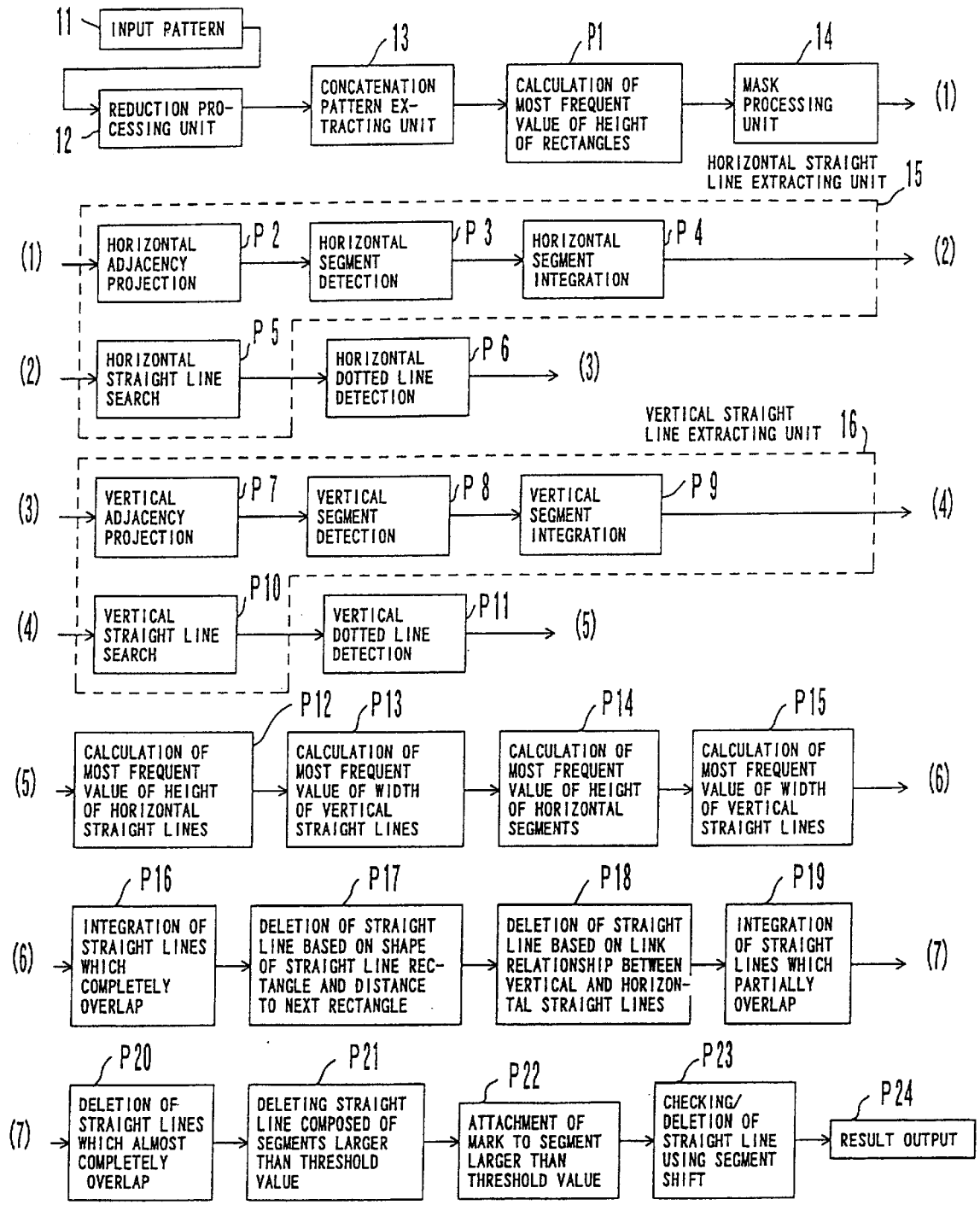
FIG. 2B is a functional block diagram showing the ruled line extracting apparatus.

FIG. 2B is a functional block diagram showing a ruled line extracting apparatus according to this embodiment. In this figure, an input pattern 11 to be targeted is a binary image in which an extreme slope or a rotation is corrected. The shaded process blocks indicate the processes mainly different from those according to the former applications, including the application "Pattern Extracting Apparatus and Pattern Region Extracting Method" (Japanese patent application H8-107568), etc.

After a reduction processing unit 12 reduces an image, and a concatenation pattern extracting unit 13 extracts a concatenation pattern, the ruled line extracting apparatus calculates the most frequent value of height of rectangles (process P1), and a mask processing unit 14 performs thinning operations.

Then, a horizontal straight line extracting unit 15 performs horizontal adjacency projection (process P2), horizontal segment detection (process P3), horizontal segment integration (process P4), and a horizontal straight line search (process P5). Next, the ruled line extracting apparatus performs horizontal dotted line detection (process P6). After a vertical straight line extracting unit 16 performs vertical adjacency projection (process P7), vertical segment detection (process P8), vertical segment integration (process P9), and a vertical straight line search (process P10), the ruled line extracting apparatus performs vertical dotted line detection (process P11).

Next, the ruled line extracting apparatus calculates the most frequent value of height of horizontal straight lines (process P12), calculates the most frequent value of width of vertical straight lines (process P13), calculates the most frequent value of height of horizontal segments (process P14), and calculates the most frequent value of width of vertical segments (process P15). Then, the apparatus integrates straight lines which completely overlap (process P16), and deletes an unnecessary straight line based on the shape of a straight line rectangle and the distance to the next straight line rectangle (process P17). Next, the apparatus deletes an unnecessary straight line based on the link relationship between vertical and horizontal straight lines (process P18), and integrates straight lines which partially overlap (process P19).

The ruled line extracting apparatus excludes a straight line which almost completely overlaps with another (process P20), and deletes a straight line composed of only segments whose sizes are larger than a predetermined threshold value (process P21). The apparatus attaches a mark to a segment whose size is larger than the threshold value (process P22), checks a straight line while shifting a segment to be targeted and deletes an unnecessary straight line (process P23), and outputs the remaining straight lines, (process P24).

Figure 3:
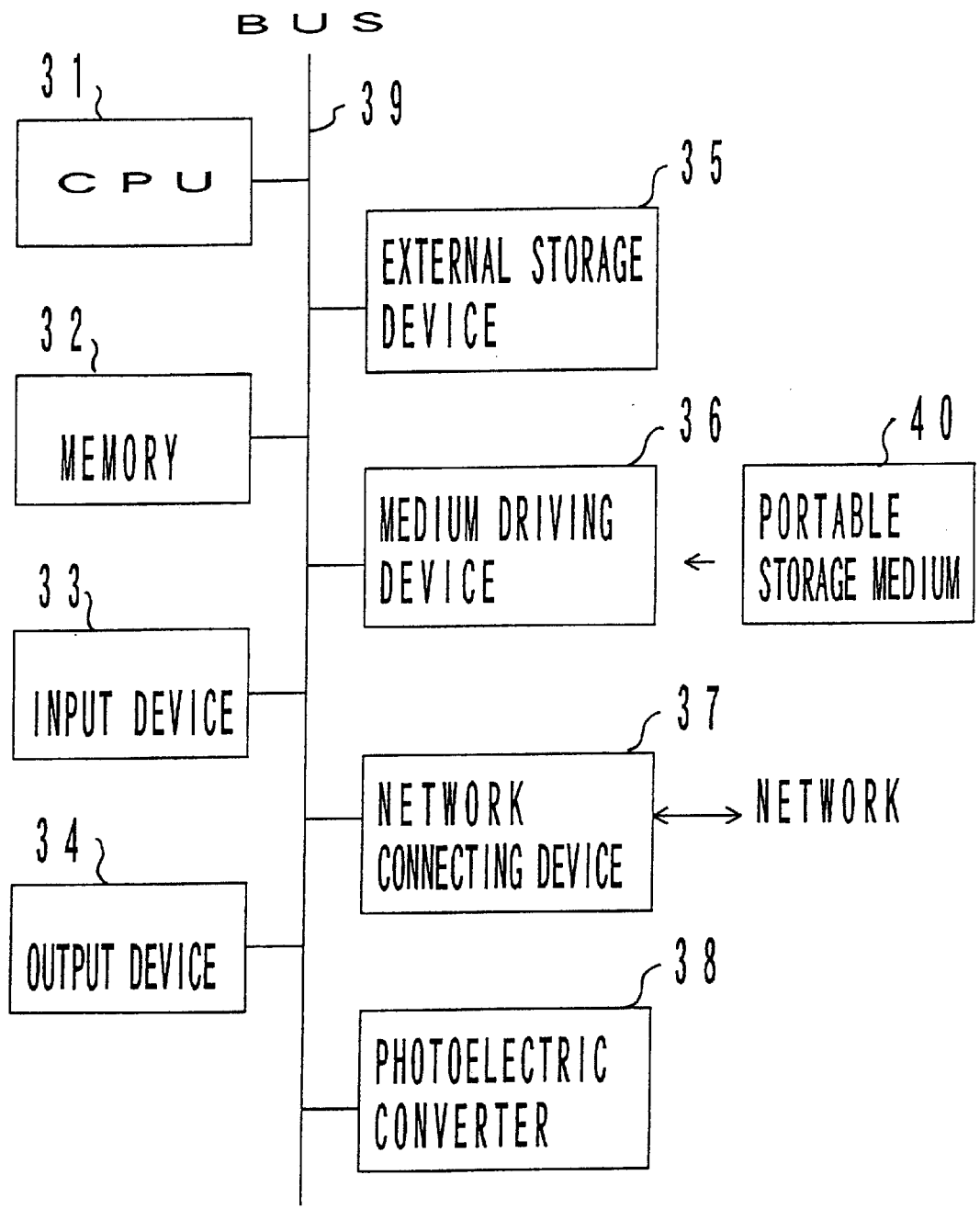
FIG. 3 is a block diagram showing the configuration of an information processing device.

The ruled line extracting apparatus according to this embodiment is implemented by, for example, an information processing device (computer) shown in FIG. 3. The information processing device shown in FIG. 3 comprises a CPU 31, memory 32, input device 33, output device 34, external storage device 35, medium driving device 36, network connecting device 37, and a photoelectric converter 38, all of which are interconnected via a bus 39.

Figure 28:
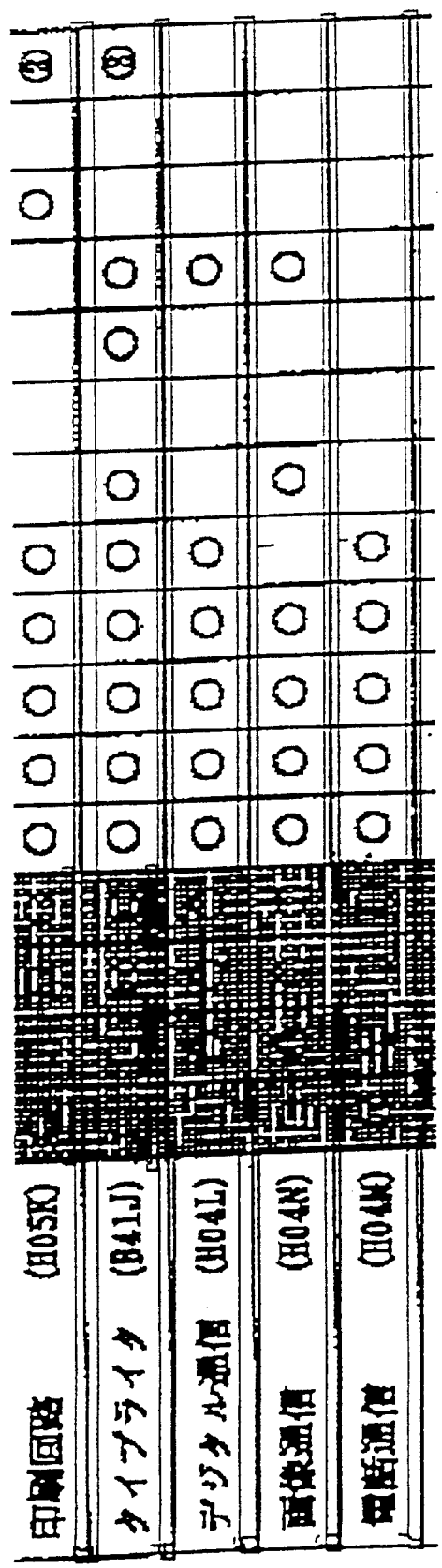
FIG. 28 is a schematic diagram showing an image after the deletion process based on the shape and position of a straight line, and a link relationship between vertical and horizontal straight lines, is performed.

The CPU 31 executes a program stored in the memory 32, and performs each of the processes shown in FIG. 28. As the memory 32, for example, a ROM (Read Only Memory), RAM (Random Access Memory), etc. are employed.

The input device 32 corresponds to, for example, a keyboard, pointing device, etc., and is used to input a request or instruction from a user. The output device 34 corresponds to a display device, printer, etc, and is used to output the result of a process, etc.

The external storage device 35 is, for example, a magnetic disk device, optical disk device, or a magneto-optical disk device, etc., and can store a program and data. It is used as a database of an electronic filing system, which is intended for storing images, keywords, etc.

The medium driving device 36 drives a portable storage medium 40, and can access its stored contents. As the portable storage medium 40, an arbitrary computer-readable storage medium such as a memory card, floppy disk, CD-ROM (Compact Disc-Read Only Memory), optical disk, magneto-optical disk, etc. can be used. The portable storage medium 40 stores the program for performing the processes shown in FIG. 2B in addition to data.

The network connecting device 37 is connected to an arbitrary communications network such as a LAN (Local Area Network), etc., and performs a data conversion, etc. accompanying a communication. The ruled line extracting apparatus can receive required data or program from an external database, etc. via the network connecting device 37. The photoelectric converter 38 is, for example, an image scanner, and is intended to input a normal document image to be processed.

Figure 4:
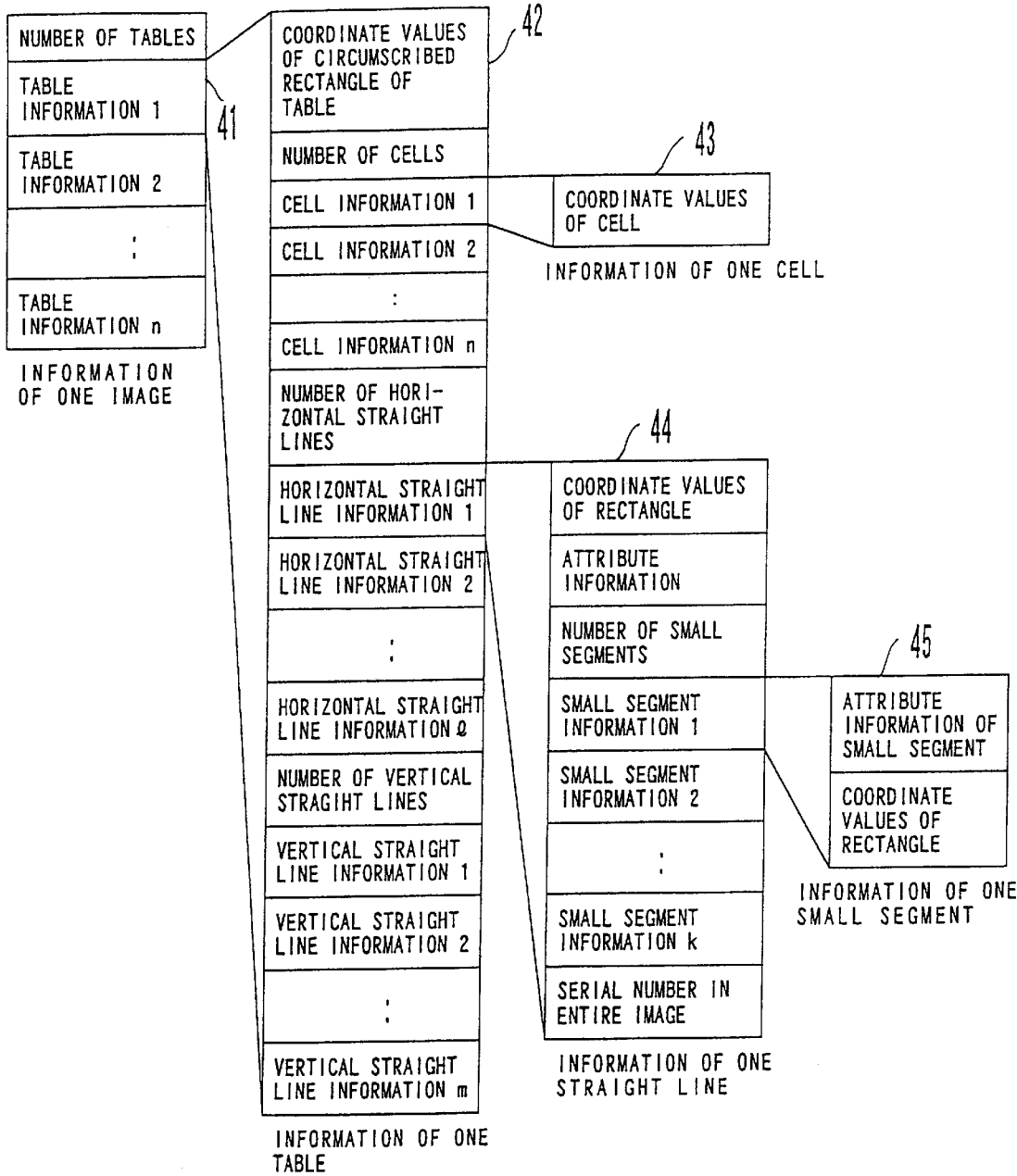
FIG. 4 shows the structure of data.

In the memory 32, data required for the processes is managed, for example, as the structure shown in FIG. 4. In this figure, information 41 of one input image is composed of the number of tables (table format frames) included in an image, and information 42 of each table.

The information 42 of each table is composed of the coordinate values of a circumscribed rectangle of a table, the number of cells included in the table, information 43 of each cell, the number of horizontal straight lines included in the table, information 44 of each horizontal straight line, the number of vertical straight lines included in the table, and information 44 of each vertical straight line. Here, a cell indicates a region surrounded by ruled lines.

The information 43 of each cell includes the coordinate values of a cell, and the information 44 of each straight line is composed of the coordinate values of a rectangle representing a straight line, the attribute information of the straight line, the number of small segments included in the straight line, information 45 of each small segment, and a serial number of the straight line in the entire image. The information 45 of each small segment includes the attribute information of a small segment, and the coordinate values of a rectangle representing the small segment. The attribute information of a straight line and a small segment are used to make a distinction, for example, between a solid line and a dotted line, and between a wild card segment whose height or width exceeds a predetermined value and another segment, etc.

Provided next is the explanation about each of the processes shown in FIG. 2B, by referring to FIGS. 5 through 24.

If the resolution of an image of the input pattern 11 is a predetermined resolution or greater, and the size of the image is relatively large, the reduction process unit 12 performs a process for reducing an image in order to improve the efficiency of the process. The input original image is stored unchanged.

The concatenation pattern extracting unit 13 extracts a black pixel concatenation region in which pixels are concatenated in 8 directions, as a partial pattern with a labelling process, in order to stably sample each pattern, without depending on the relative relationship between the positions at which a plurality of tables are arranged. The concatenation pattern extracting unit 13 then extracts a table pattern included in an image by examining the partial pattern.

Since the size of the partial pattern obtained with the labelling process is needed later, the concatenation pattern extracting unit 13 calculates the coordinate values of the verteces of the circumscribed rectangle which approximates the partial pattern while performing the labelling process.

The concatenation pattern extracting unit 13 then extracts a pattern whose size is predetermined or larger among extracted partial patterns, as a candidate of a table.

When a large concatenation pattern is extracted, also a pattern inside the large concatenation pattern, whose size is predetermined or larger, is extracted at the same time, and these large and small patterns are handled as the patterns having the same label. If a pattern which originally represents one table is separated into two or more patterns due to a blur, the separated patterns can be processed as patterns belonging to an identical label. Now, we shall calculate the allowable length of a blur based on the size of a pattern to be targeted.

Figure 5:
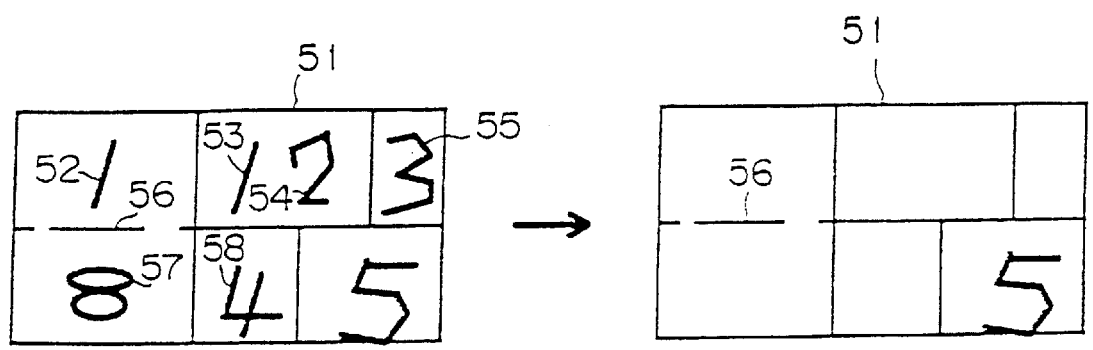
FIG. 5 is a schematic diagram showing a labelling process.

FIG. 5 exemplifies the above described labelling process. In an image on the left side of FIG. 5, the concatenation pattern extracting unit 13 first extracts a pattern 51 having the largest circumscribed rectangle, and attaches a label to it. Since the width of a horizontal line pattern 56 between patterns 52 and 57 is a predetermined value or more, the concatenation pattern extracting unit 13 recognizes the horizontal line pattern 56 as a portion of the large pattern 51 and handles these patterns as the patterns having the same label in the following process, as shown on the right side of FIG. 5. Accordingly, the pattern 56 is attached with the same label as that of the pattern 51.

Next, the ruled line extracting apparatus obtains the histogram representing the frequency distribution of heights of rectangles extracted by the concatenation pattern extracting unit 13 using the method according to the former application Ser. No. 08/694,503 in the process P1. The apparatus then obtains the most frequent value "most_freq_height", and estimates it as the standard size of characters included in a document. The obtained most frequent value is used to set various types of threshold values in the following processes. The process for calculating the most frequent value is performed as follows.

Figure 6:
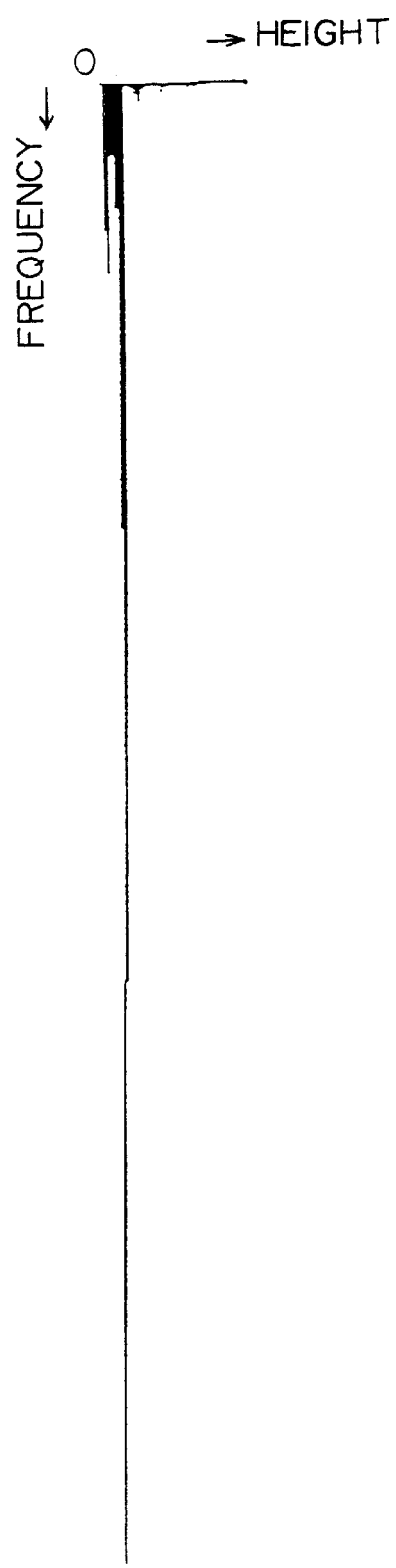
FIG. 6 shows a histogram of heights.

First of all, a histogram of heights of rectangles shown in FIG. 6 is generated from a set of circumscribed rectangles resulting from the labelling process. In FIG. 6, the horizontal axis indicates the height of each circumscribed rectangle, while the vertical axis indicates the number of rectangles having that height (frequency value). Here, the height of a circumscribed rectangle is obtained by using the height of one pixel as the unit of height.

Next, the correspondence between the frequency value and the maximum height among the heights of rectangles having that frequency value is obtained, and stored as a table of heights of rectangles in the memory 32. The contents of the table are sequentially examined starting from the frequency value "0". If the amount of a change of height is within "1", changing frequency values are successive, and the total of the changes of the frequency values is equal to or greater than a predetermined value, the greatest height among those with the changing frequency values is defined as the most frequent value "most_freq_height" of height.

Figure 7:
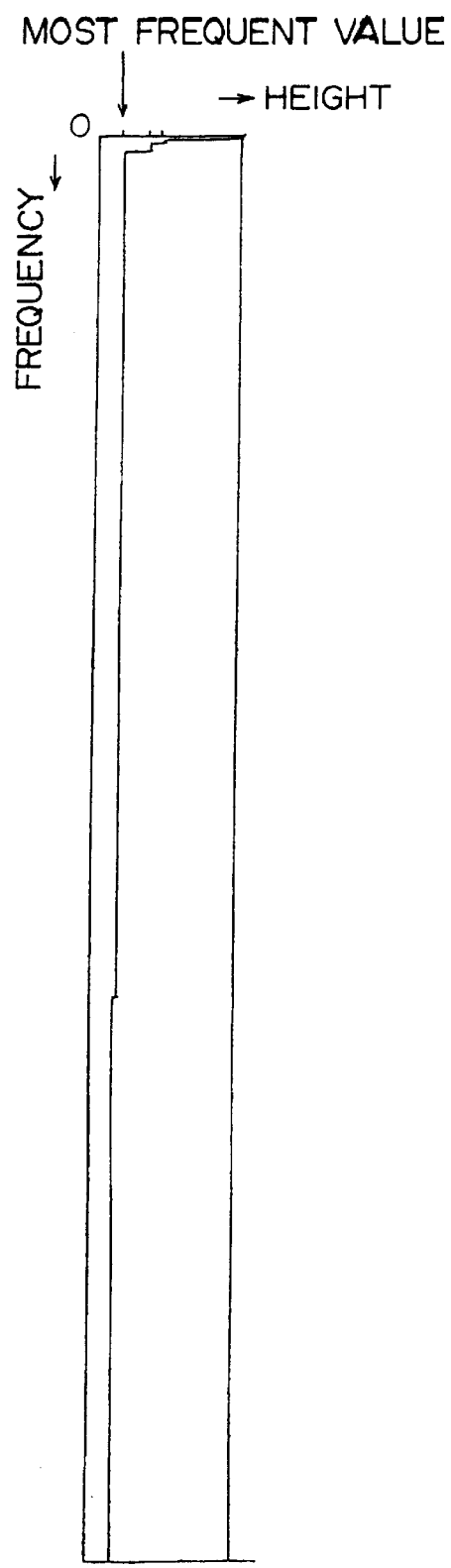
FIG. 7 shows a histogram for obtaining the most frequent value of height.

FIG. 7 shows a histogram representing the contents of the table of heights of rectangles corresponding to the histogram shown in FIG. 6. It is known from FIG. 7 that the height at which the frequency value rapidly changes is the highest frequency value. If the most frequent value is so obtained, the influence of noise smaller than one character is eliminated, and the height of the standard size of characters included in a document can be obtained.

Figure 8:
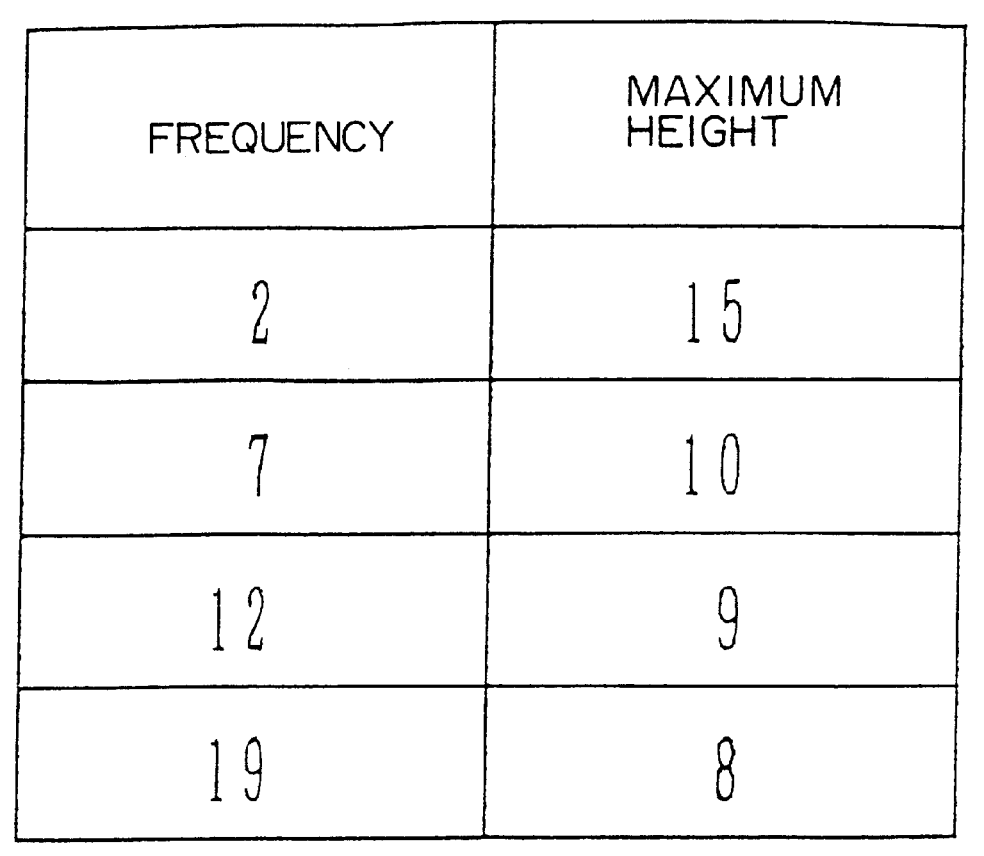

FIG. 8 exemplifies a simple table of heights of rectangles. In this figure, four frequency values and a maximum height among the heights of the rectangles having these frequency values are stored in pairs. If the contents of the table are put into a histogram, it will be as shown in FIG. 9.

Figure 9:
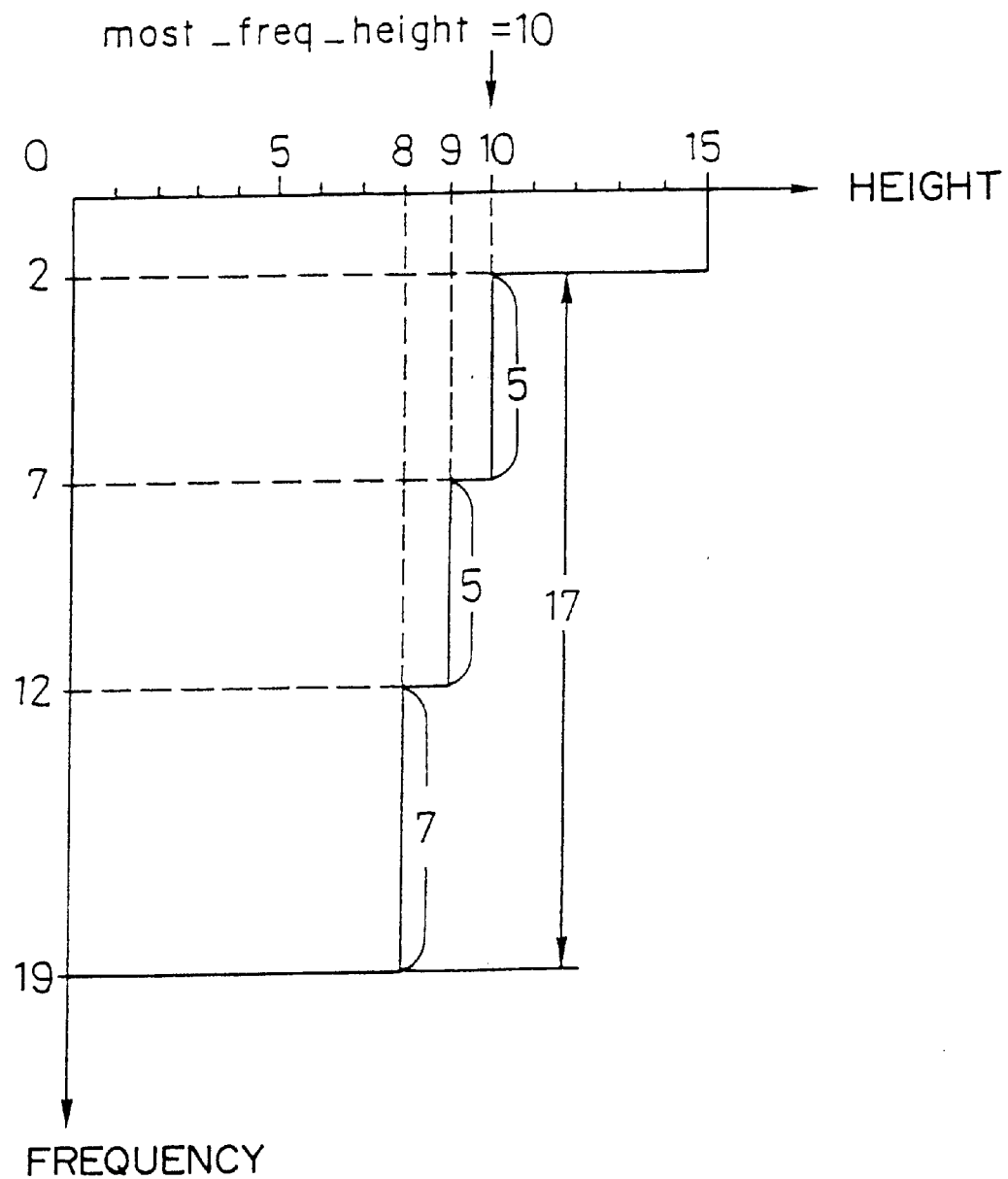
FIG. 9 shows a histogram corresponding to the contents of the table of rectangle heights.

Considering the histogram shown in FIG. 9 sequentially from the lowest frequency value to the highest, in other words, from the highest height to the lowest, it is known that the frequency values change at the respective positions of the heights 10, 9, and 8, by 5, 5, and 7. The differences between these consecutive heights are 1, and the total of the changes of the frequency values is 17. Assuming that the threshold value of changes of frequency values is 9, the total of the changes of the frequency values at the respective positions of the heights 10, 9, and 8 is more than the threshold value. Therefore, the height that first appears "10" is recognized as "most_freq_height".

Next, the mask processing unit 14 recognizes a concatenation pattern extracted by the concatenation pattern extracting unit 13, whose size is a predetermined size or greater, and a concatenation pattern (having the same label as that of the former) included in the former pattern, whose size is a predetermined size or greater, as candidates of a table. The mask processing unit 14 then performs the mask process with the method according to the former application "Frame Extracting Apparatus and Rectangle Extracting Apparatus" (Japanese patent application H7-203259).

This mask process is performed to facilitate the extraction of a long straight line included only in a table by excluding an extremely oblique component from an image. Specifically, the mask process 14 scans the entire image using two types of mask rectangles such as horizontally and vertically long rectangles whose sizes are predetermined, and calculates the ratio of black pixels within a mask. If the ratio is equal to or larger than a predetermined value, the entire region in the mask is filled with black pixels, and left as a pattern. If the ratio is smaller than the predetermined value, the pattern in the mask is deleted. In this way, the extraction of vertical and horizontal components is performed.

If the above described ratio reaches a predetermined threshold value due to the succession of a plurality of rows or columns, a large rectangular range is generated by combining the successive patterns, and its center line is recognized as the result of the process. With this process, a thick pattern is made thinner. Furthermore, to eliminate a gap between segment patterns resulting from the process, ranges to which masks are applied are set so that they overlap each other. The original image prior to the mask process is stored separately from the image after the mask process.

Figure 10:
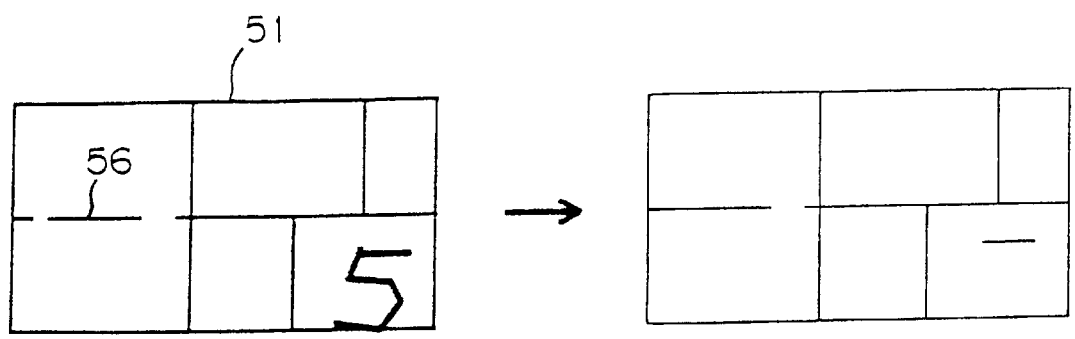
FIG. 10 is a schematic diagram showing a mask process.

FIG. 10 shows the result of the mask process performed for the two patterns 51 and 56 shown on the right side of FIG. 5. In this case, the image before the process, which is shown on the left side of FIG. 10, is converted into one shown on the right side of FIG. 10. Only the vertical and horizontal components of the patterns 51 and 56 are extracted in the image after the conversion, and the entire pattern is made thinner. Additionally, as a result of adding part of the patterns in the mask process, the patterns 51 and 56 are proved to be concatenated.

Figure 11:
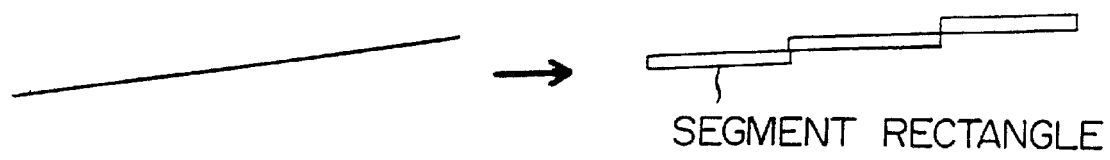
FIG. 11 is a schematic diagram showing a segment detection process.

Then, the horizontal line extracting unit 15 calculates the projection value of the image generated by performing the mask process for the partial pattern, which is shown in FIG. 10, using the conventional adjacency projection method. A horizontal segment of a predetermined length or part of the horizontal straight line is approximated using rectangles, and detected in the process P3 as shown in FIG. 11. These processes use the image for which the mask process is performed, while the following process uses the original image.

Figure 12:
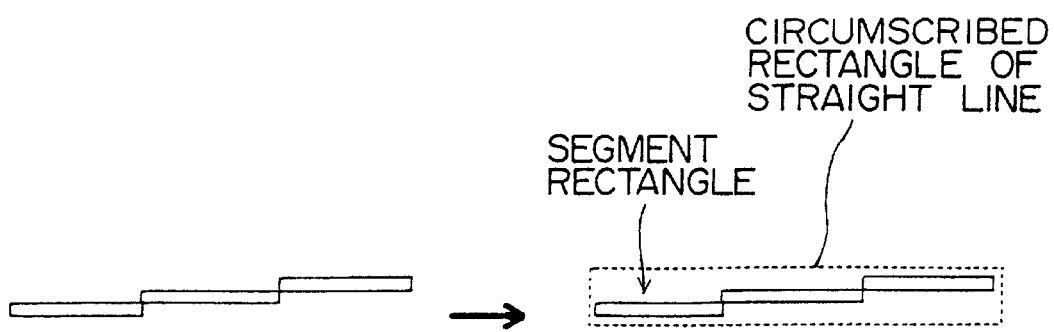
FIG. 12 is a schematic diagram showing a first segment integration process.
Figure 13:
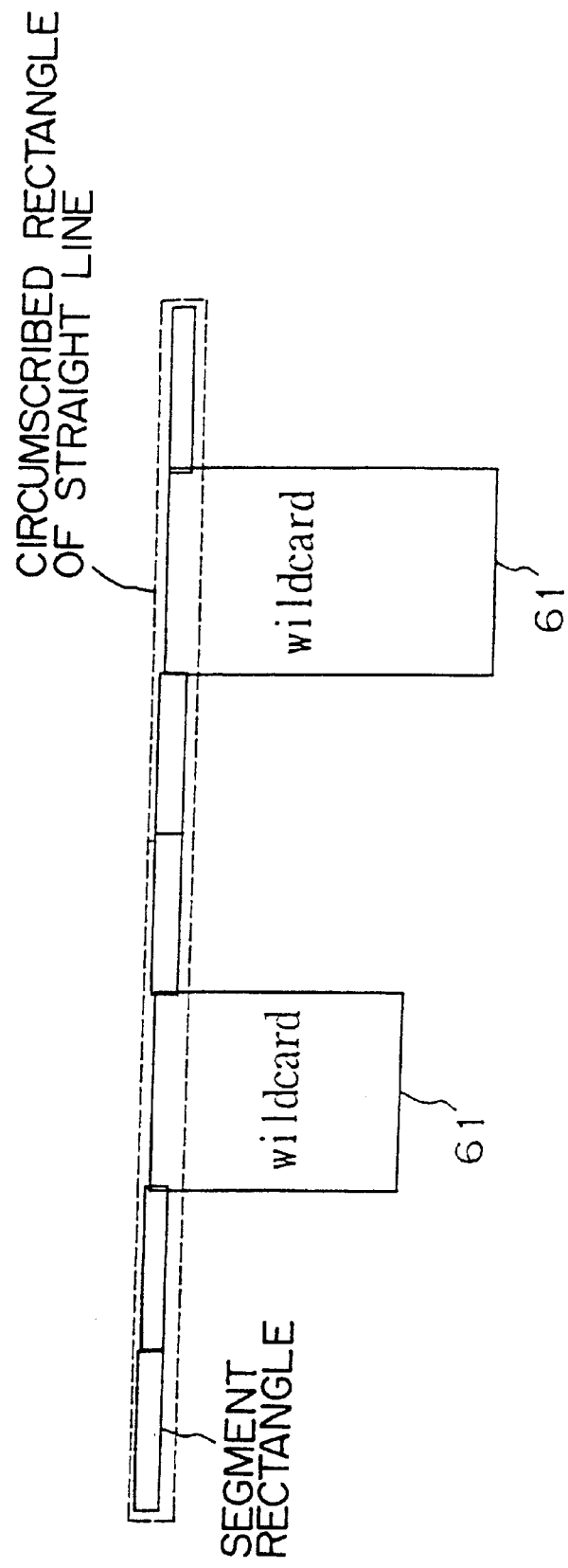
FIG. 13 is a schematic diagram showing a second segment integration process.

The horizontal straight line extracting unit 15 examines the link state of segments in the process P4, and extracts a straight line composed of several segments as a ruled line candidate. With this process, a long straight line is detected by integrating the adjacent rectangular segments among the detected rectangular segments, and the horizontal straight line extracting unit 15 approximates the detected straight line using its circumscribed rectangle as shown in FIG. 12.

If a segment, whose thickness is a predetermined thickness or greater (a wild card segment) 61 (see FIG. 13), is found partway at the time of the integration of segments, it is ignored and only the thin segments excluding the thick segment are targeted and integrated. Whether or not a segment is a wild card segment is determined depending on the attribute information described in the segment information 45 shown in FIG. 4. If such a large segment exists, the straight line including the large segment is not output. The integration process which does not affect the large segment for a straight line, is performed.

In this way, even if there is a pattern such as a character or a graphic, etc., which touches a shaded portion or a ruled line, only a ruled line can be extracted by excluding the character or the graphic, etc. The details of such an integration process is to be described later. The information of a straight line extracted as a result of the integration process includes the information of each of segments structuring the straight line as shown in FIG. 4.

Figure 14:
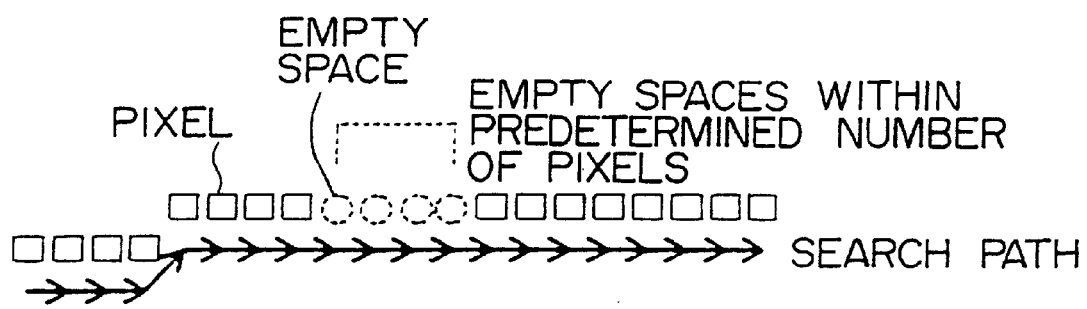
FIG. 14 is a schematic diagram showing a straight line search process.
Figure 15:
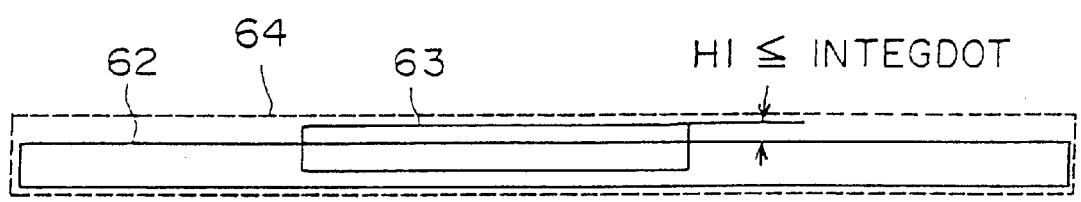
FIG. 15 is a schematic diagram showing a process for integrating straight lines which completely overlap.

The horizontal straight line extracting unit 15 then searches, as shown in FIG. 14, for the pattern (pixels) of the straight line in order to accurately detect the right and left ends of the horizontal straight line which is approximated using the rectangles in the process P5. If a portion without pixels (empty space) is found in a proceeding direction during the search, the search is continued in the proceeding direction based on the assumption that pixels up to a predetermined number exist. If an empty space beyond the predetermined number exists, the search is terminated at that point. The following process uses the point detected by a search as the end of a straight line.

Next, the ruled line extracting apparatus extracts a horizontal dotted line using the method according to the former application "Frame Extracting Apparatus and Rectangle Extracting Apparatus" (Japanese patent application H7-203259). With this process, partial patterns of a predetermined size, which are arranged regularly, are searched, and the position of a dotted line is represented by circumscribing them by a rectangle.

In the following process, a rectangle representing the position of a dotted line is handled in a similar manner as for a rectangle representing the position of a detected straight line. Note that, however, a dotted line attribute is attached to the attribute information of a straight line corresponding to a dotted line, while a solid line attribute is attached to the attribute information of a straight line corresponding to a solid line. That is, the distinction between these lines is made.

The processes P7, P8, P9, P10, which are performed by the vertical straight line extracting unit 16, and the vertical dotted line detection process P11, are similar to those in the above described cases of a horizontal straight line and a horizontal dotted line.

The ruled line extracting apparatus then calculates the representative value of the heights of horizontal straight lines in the process P12. With this process, the histogram of the heights of extracted horizontal straight lines is generated, and the height with the highest frequency is recognized as the most frequent value "mfheight" of height of horizontal straight lines, and used as the representative value of the heights of horizontal straight lines. Similarly, the representative value (highest frequency value) "mfwidth" of width of vertical straight lines is calculated in the process P13.

These representative values are used to set each threshold value in the following process. Furthermore, suitable values other than the highest frequency values may be used as the representative values of the heights of horizontal straight lines and the widths of vertical straight lines.

Next, the ruled line extracting apparatus calculates the representative value of the heights of horizontal segments in the process P14. With this process, the histogram of the heights of all of horizontal segments structuring all of the straight lines included in an image, is generated, and the height with the highest frequency is recognized as the most frequent value "mfheight_small" of height of the horizontal segments, and used as the representative value of the heights of the horizontal segments. Similarly, the most frequent value "mfwidth_small" of width of all of the vertical segments structuring all of the vertical straight lines, is calculated in the process P15.

Also these representative values are used to set each threshold value in the following process. Furthermore, suitable values other than the highest frequency values may be used as the representative values of the heights of horizontal segments and widths of vertical segments.

Next, the ruled line extracting apparatus integrates straight lines which completely overlap in the process P16. With this process, if one straight line almost completely overlaps with another, they are integrated into one. In the case of the two straight lines 62 and 63 shown in FIG. 15, assuming that the height H1 of the portion in which no overlap exists is within a predetermined allowed number of pixels INTEGDOT, they are recognized to completely overlap, and integrated into one straight line rectangle 64. The value of INTEGDOT is set to, for example, 2.

The ruled line extracting apparatus then deletes an unnecessary straight line based on the shape of a straight line rectangle or the distance between adjacent straight lines, in the process P17. For the process of a horizontal straight line, the threshold value of the height "th_hei" and the threshold value of the length (width) "th_len" are respectively calculated based on the following equations.

$$th\_hei = most\_freq\_height * 2/3 \qquad (1)$$

$$th\_len = most\_freq\_height * 5 \qquad (2)$$

A corresponding horizontal straight line is then deleted in the following cases.
(a) If the ratio of the height to the width of a horizontal straight line rectangle is equal to or greater than a threshold value FTH (=0.11).
(b) If the ratio of the height to the width of the horizontal straight line rectangle is equal to or greater than a threshold value FTH2 (=0.04), and the height of the horizontal line rectangle is equal to or higher than the threshold value of the height of the straight line rectangle "th_hei".
(c) If the width of the horizontal straight line rectangle is smaller than a threshold value of the length "th_len".
(d) If the width of a horizontal straight line which is lower than the position of the current horizontal straight line, and closest to the current line, is smaller than the threshold value of the length "th_len".

Figure 16:
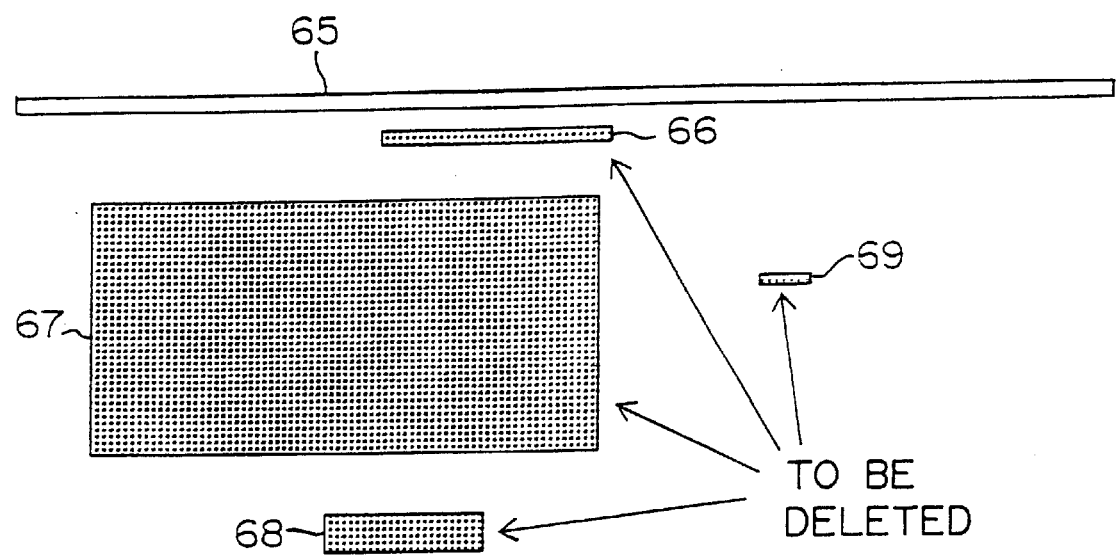
FIG. 16 is a schematic diagram showing a first straight line deletion process.

For example, in FIG. 16, a straight line 67 is deleted because it corresponds to the above described case (a); a straight line 68 is deleted because it corresponds to the case (b); and a straight line 69 is deleted because it corresponds to the case (c). Assuming that a straight line 65 is the current horizontal straight line, then a straight line 66 is deleted because it corresponds to the case (d).

Furthermore, if the distance between two adjacent straight lines is less than the threshold value obtained from "most_freq_height", either of the two lines (for example, a shorter one) is deleted. The same operation can be applied to the process for a vertical straight line.

The ruled line extracting apparatus then deletes any unnecessary straight lines based on the link relationship between vertical and horizontal straight lines in the process P18. With the process for a horizontal straight line, if the end of a horizontal straight line rectangle to be targeted does not touch any vertical straight line rectangle, the horizontal straight line rectangle is deleted. As a result, an isolated straight line which does not structure a frame of a table, such as one extracted from a defaced and concatenated character string, is deleted.

Figure 17:
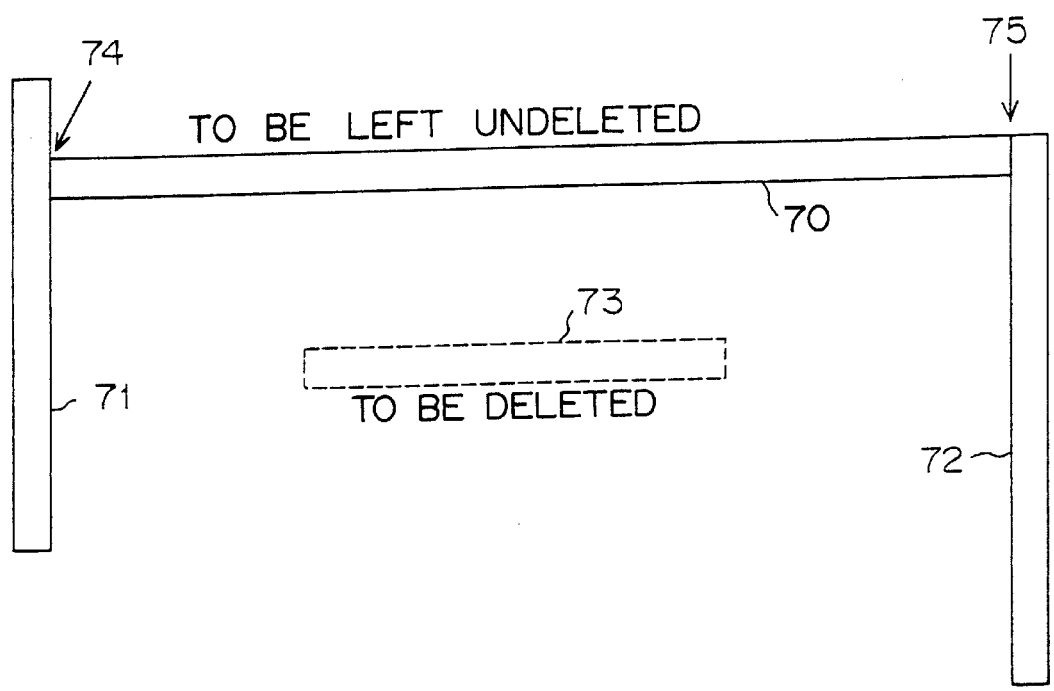
FIG. 17 is a schematic diagram showing a second straight line deletion process.
Figure 18:
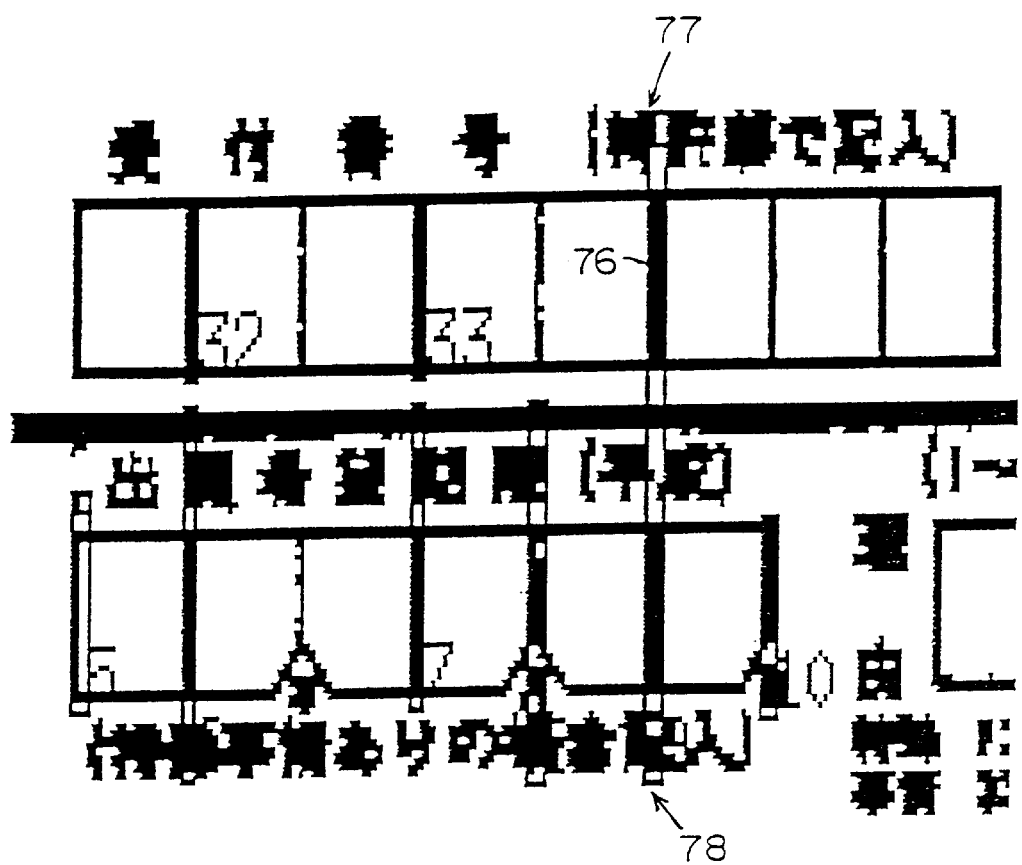
FIG. 18 is a schematic diagram showing a straight line which must not be deleted.

Since both ends 74 and 75 of a horizontal straight line 70 touch vertical straight lines 71 and 72, for example, in FIG. 17, the horizontal straight line 70 is not deleted. In the meantime, since a horizontal straight line 73 does not touch any vertical straight line, it is deleted. The same process is applied to the process for a vertical straight line. With such a deletion process, however, a straight line which should normally be left may be sometimes deleted due to the influence of a character pattern in an image, etc. For example, the ends 77 and 78 of the vertical straight line 76 do not touch any horizontal straight lines in the image shown in FIG. 18. Therefore, the vertical straight line 76 is deleted although it structures the frame of the table.

Accordingly, the target of the deletion process is determined to be limited to two straight lines which are close to each other, in order to leave a necessary line undeleted. In this case, a horizontal straight line rectangle "j", which is lower than a current horizontal straight line rectangle "i", and whose distance to the rectangle "i" is less than the most frequent value "most_freq_height" of height of rectangles, is obtained.

If the ends of one of the horizontal straight line rectangles "i" and "j" do not touch any vertical straight line rectangles, and the ends of the vertical straight line rectangles do not touch the horizontal straight line rectangle, the horizontal straight line rectangle is deleted. This process is also applied to the process for a vertical straight line. With such a deletion process, the vertical straight line 76 shown in FIG. 18 does not become a process target, and is left undeleted.

Figure 19:
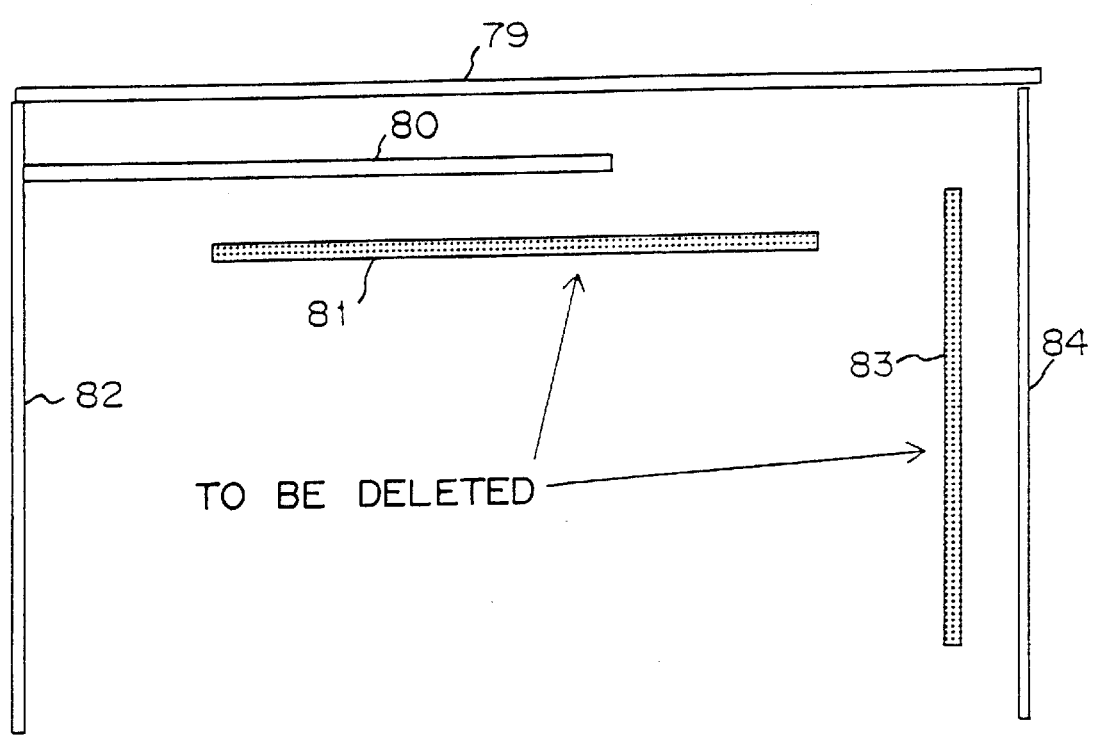
FIG. 19 is a schematic diagram showing a third straight line deletion process.

Furthermore, since adjacent horizontal straight lines 79 and 80 are targeted and their ends touch a vertical straight line 82, they are not deleted, in FIG. 19. Next, a horizontal straight line 81 adjacent to the horizontal straight line 80 is targeted. Since this line 81 does not touch any vertical straight line, it is deleted. The end of a vertical straight line 84 among adjacent vertical straight lines 83 and 84 touches the horizontal straight line 79. Accordingly, it is not deleted. In the meantime, the vertical straight line 83 is deleted because it does not touch any horizontal straight line.

Next, the ruled line extracting apparatus integrates straight lines which partially overlap in the process P19. With this process, horizontal straight lines are arranged in descending order of the length of horizontal straight lines. Then, one straight line "i" is targeted in the descending order of the length, and one or more straight lines which partially overlap with the straight line "i" are obtained.

If the straight lines which partially overlap and the straight line "i" are integrated into one straight line rectangle, and its height is equal to or lower than the threshold value (mfheight+THDOT), the integration is performed. The value of THDOT is set to, for example, 2. In this way, if the result of the integration of straight lines becomes the most frequent value "mfheight" of height or so, they are integrated into one. The same process is applied to the process for a vertical straight line.

Figure 20:
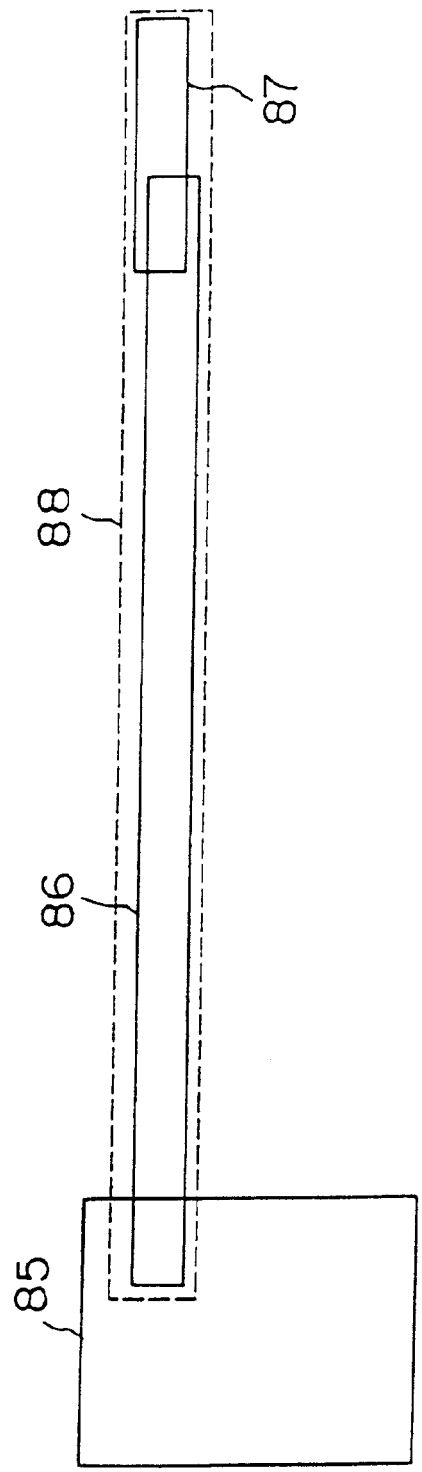
FIG. 20 shows a process for integrating straight lines which partially overlap.

In FIG. 20, straight lines 85 and 86 partially overlap each other, and straight lines 86 and 87 partially overlap each other. If the straight lines 85 and 86 among them are integrated, the height of the integrated rectangle exceeds the threshold value. Accordingly, only the straight lines 86 and 87 are integrated, and approximated using the circumscribed rectangle. The same process is applied to the process for a vertical straight line.

Figure 21:
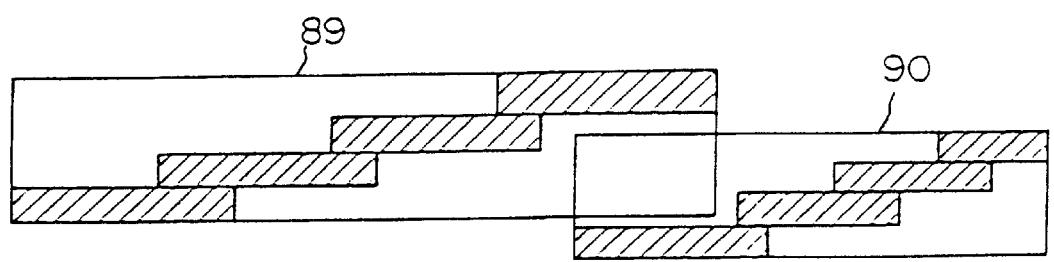
FIG. 21 is a schematic diagram showing the inside of straight lines which partially overlap.

The reason why such a process for integrating straight lines is performed is that all of segment rectangles extracted from one straight line pattern may not sometimes be integrated only with the processes P4 and P9. By way of example, segment rectangles (shaded portions) included in two horizontal straight lines 89 and 90 which overlap as shown in FIG. 21 are separate. Accordingly, the straight lines 89 and 90 are not integrated with the process P4. The process P19 allows them to be integrated in such a case.

Figure 22:
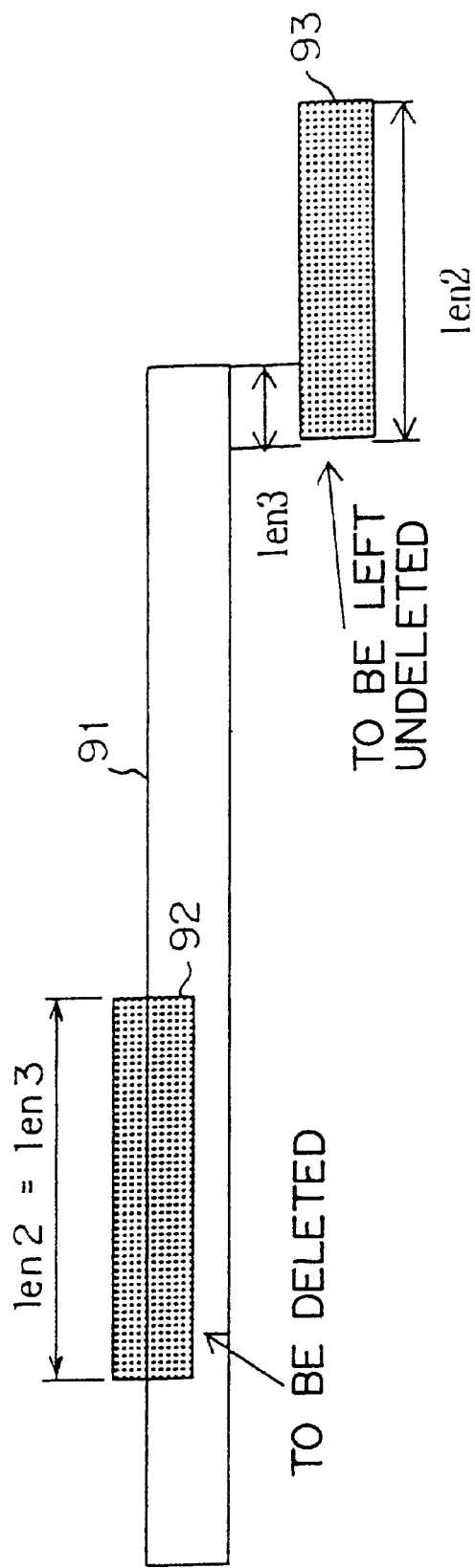
FIG. 22 is a schematic diagram showing a fourth straight line deletion process.

Next, the ruled line extracting apparatus deletes a shorter line of two straight lines which almost completely overlap in the process P20. With this process, horizontal straight line rectangles are sorted in descending order of the length of a horizontal straight line. Next, horizontal straight line rectangles "i" are extracted one by one in the descending order, and a horizontal straight line rectangle "j" which partially overlaps with the horizontal straight line rectangle "i", is targeted. At this time, the position relationship between the straight lines "i" and "j", which is shown with reference to FIG. 22, is recognized as being the process target. Assuming that a straight line 91 is recognized as the straight line "i", straight lines 92 and 93 correspond to the straight line "j", as shown in FIG. 22.

Then, the portion in which the straight lines "i" and "j" horizontally overlap is obtained. If the ratio "len3/len2" of the length of the overlapping portion "len3" to the width of the straight line "j" "len2" is greater than a threshold value OVERRATE, the following process is performed by recognizing the straight line "j" as a deletion candidate. Note that, however, the value of OVERRATE must be smaller than "1".

First of all, the vertical distance between the straight lines "i" and "j" is obtained. The difference between the coordinate values of the straight lines "i" and "j" may be defined as the distance at this time. However, the distance between small segment rectangles in the straight lines is defined as the distance between the straight lines in consideration of the case in which the straight lines are inclined. The explanation about such a method for obtaining the distance value is provided by referring to FIG. 23.

Figure 23:
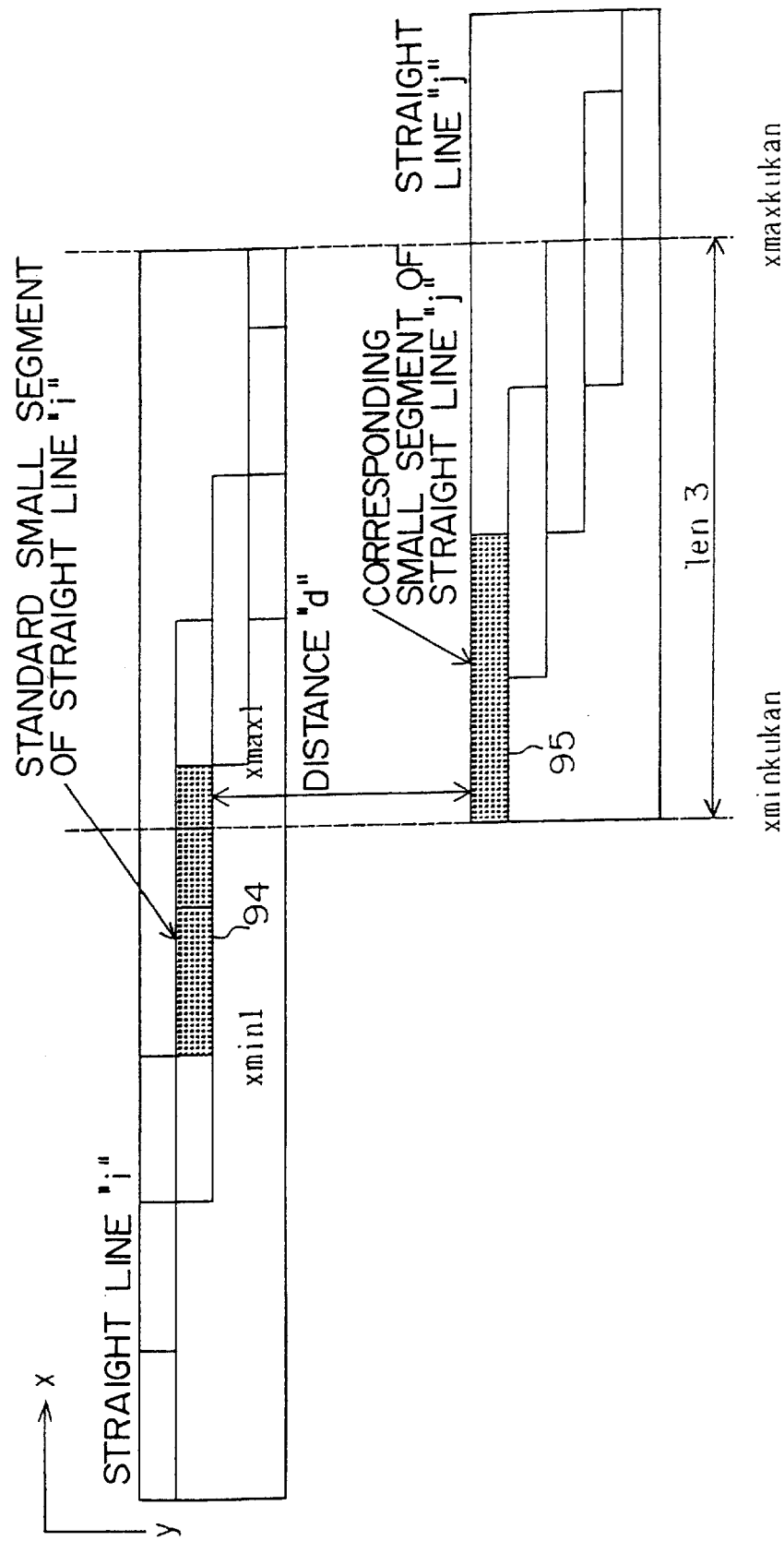
FIG. 23 is a schematic diagram showing how to obtain the value of a distance between two straight lines.

Assuming that the x axis indicates the horizontal direction and the y axis indicates the vertical direction, the straight lines "i" and "j" overlap in the section with the length "len3" from a point "x=xminkukan" to a point "x=xmaxkukan", and these lines respectively include a plurality of segments, as shown in FIG. 23.

The ruled line extracting apparatus first extracts a segment which is not determined to be a wild card segment with the segment integration process P4 and is first included in the overlapping portion, from a set of segments included in the straight line "i", and recognizes the extracted segment as a standard segment. Here, a segment 94 is the standard segment. Then, the values of the x coordinate (xmin1, xmax1) of the standard segment 94 are obtained.

Next, the apparatus extracts all of the segments whose x coordinate values are within the range from "xmin1" to "xmax1" from the set of the segments in the straight line "j". It obtains the average value of the y-axis distance between the extracted segment and the standard segment 94 in the straight line "i", and recognizes the obtained value as the distance value between the straight lines "i" and "j".

Because the corresponding segment in the straight line "j" is only the segment 95 in this case, the distance between this segment and the standard segment 94 "d" itself will be the distance value between the straight lines "i" and "j". With such a calculation method, an accurate distance between straight lines can be obtained even if the straight lines are inclined.

The ruled line extracting apparatus determines whether or not to delete the straight line "j" based on the thus-obtained distance between the straight lines "i" and "j". If the straight line "j" is higher than the straight line "i", like the straight line 92 shown in FIG. 22, the straight line "j" is deleted when the value of the distance between the straight lines "i" and "j" is equal to or smaller than the threshold value OVERDOT. The value of OVERDOT is set to, for example, "1". If the straight line "j" is lower than the straight line "i", like the straight line 93, the straight line "j" is deleted when the distance between them is smaller than the threshold value "most_freq_height".

As described above, an unnecessary horizontal straight line is excluded by deleting the shorter of two horizontal straight lines which almost completely overlap. The same process is also applied to the process for a vertical straight line.

The ruled line extracting apparatus then deletes a straight line composed of segments larger than a predetermined threshold value in the process P21. With this process, if the heights of all of segments included in a horizontal straight line are higher than the threshold value (mfheight_small*2−1), the straight line is recognized as a straight line which is erroneously extracted from a character string, and deleted. The same process is also applied to the process for a vertical straight line.

If a segment rectangle structuring a straight line rectangle is larger than a threshold value, the ruled line extracting apparatus marks the information about the segment rectangle, and obtains the total number of black pixels included in unmarked segment rectangles, in the processes P22 and P23. The apparatus shifts the set of the unmarked segment rectangles in the direction perpendicular to the direction of the length of the straight line rectangle, and generates a graph representing the relationship between the amount of shift and the total number of black pixels. If the shape of the graph is gentle, the straight line rectangle is excluded from ruled line candidates.

The ruled line extracting apparatus first performs a preprocess for the process P23 in the process P22. With this process, if the height of a segment included in the horizontal straight line is higher than the threshold value "mfheight_small", the apparatus sets the attribute information of that segment to a wild card segment, so that the segment is not used in the process P23. The same process is also applied to the process for a vertical straight line.

Next, the apparatus performs a process for checking/deleting a straight line using a segment shift. With this process, the total number of black pixels included in a plurality of horizontal segment rectangles structuring one horizontal straight line rectangle is obtained, and is recognized as the total number of black pixels at the position indicating the amount of shift "0" (center position). The apparatus then obtains the total number of black pixels at each position by shifting the segment rectangles up and down in the vertical direction perpendicular to a direction of the length of the horizontal straight line rectangle by the amount of the height of the horizontal straight line rectangle, and generates a graph representing the total number of black pixels corresponding to the amount of shift.

If a ratio of the total number of black pixels at the positions respectively in the upward and downward directions to a standard number, when the maximum value of the total number of black pixels around the center position is defined as the standard number, is smaller than a predetermined value, the apparatus recognizes that straight line rectangle as a ruled line, and outputs it. In other cases, the straight line rectangle is a straight line which is erroneously extracted from a character string, etc. It is not recognized as a ruled line, and deleted. The same process is applied to a process for a vertical straight line.

Figure 24:
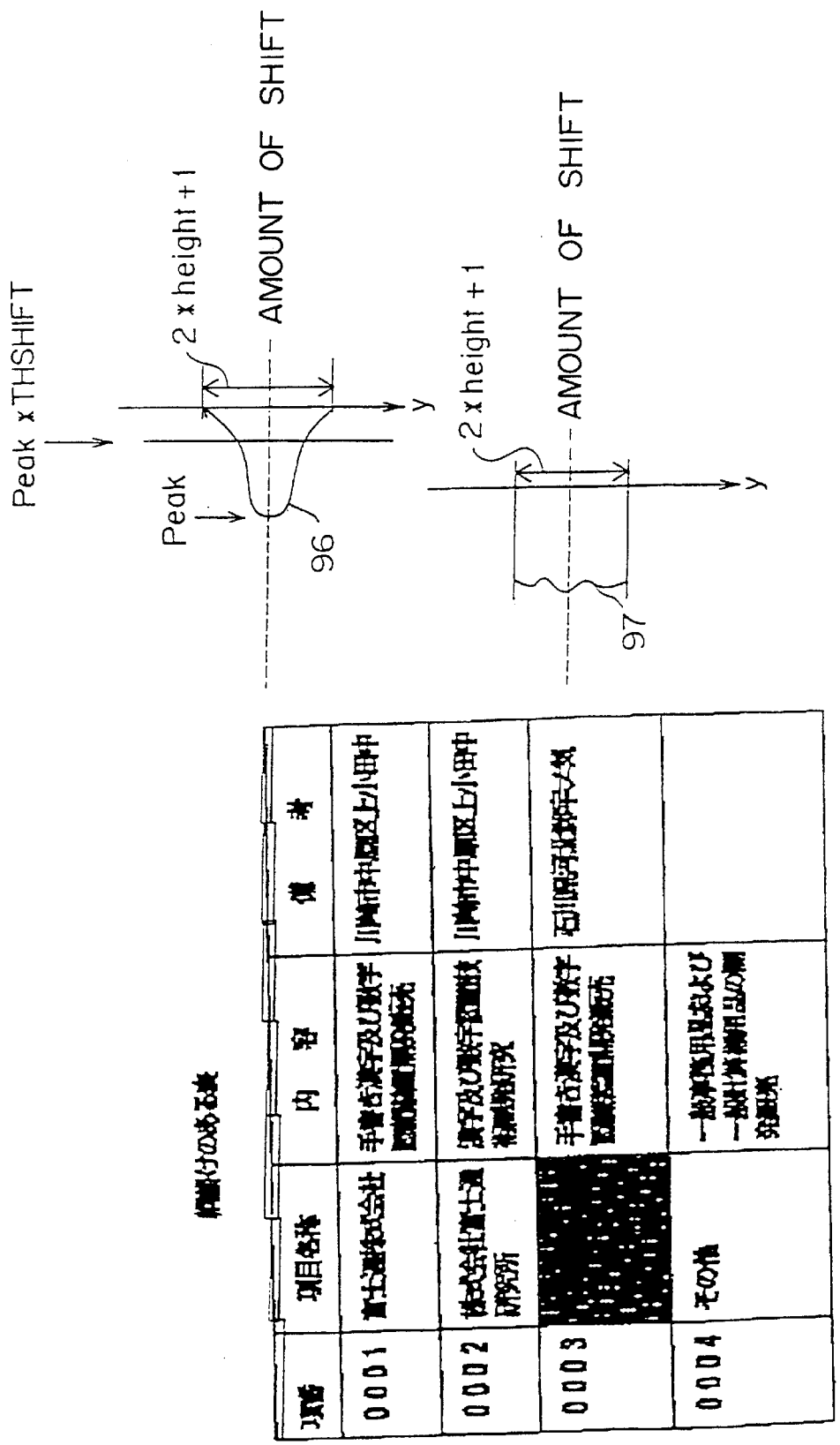
FIG. 24 is a schematic diagram showing a fifth straight line deletion process.

For example, the graph shown in FIG. 24 is generated for the image shown in FIG. 1C. In FIG. 24, graphs 96 and 97 respectively represent the distributions of black pixels around the corresponding horizontal straight lines. Assuming that the height of the horizontal straight line is "height", each of the segments in the horizontal straight line is shifted by one pixel in the "y" direction in the section "+/−height", and the total number of black pixels included in the segments at each shift position is plotted.

In the graph 96, the maximum value "Peak" of the total number of black pixels exists at the position of the amount of shift "0". The distribution of the total number of black pixels is lower than the value obtained by multiplying "Peak" by "THSHIFT" in the upper and lower portions of the graph. The value of "THSHIFT" is set to, for example, 0.44.

Such a distribution indicates that black pixels are concentrated at the position of the amount of shift "0", and the horizontal straight line corresponding to that position is recognized as a ruled line.

In the meantime, in the graph 97, the distribution of the total number of black pixels in the section "+/−height" is gentle, and the values of the positions which are higher and lower than the position of the amount of shift "0" are not lower than the value obtained by multiplying "Peak" by THSHIFT. Such a distribution represents that black pixels are scattered in the portions which are higher and lower than the position of the amount of shift "0", and the horizontal straight line corresponding to that portion is not recognized to be a ruled line, and deleted.

Such a process for checking/deleting a straight line deletes a straight line extracted from a shaded portion or a defaced character string included in a table, and only an original ruled line is output as the result of the process. The details of the process for checking/deleting a straight line will be described later.

Provided below are the explanations about the specific examples of the above described processes, by referring to FIGS. 25 through 36.

Figure 25:
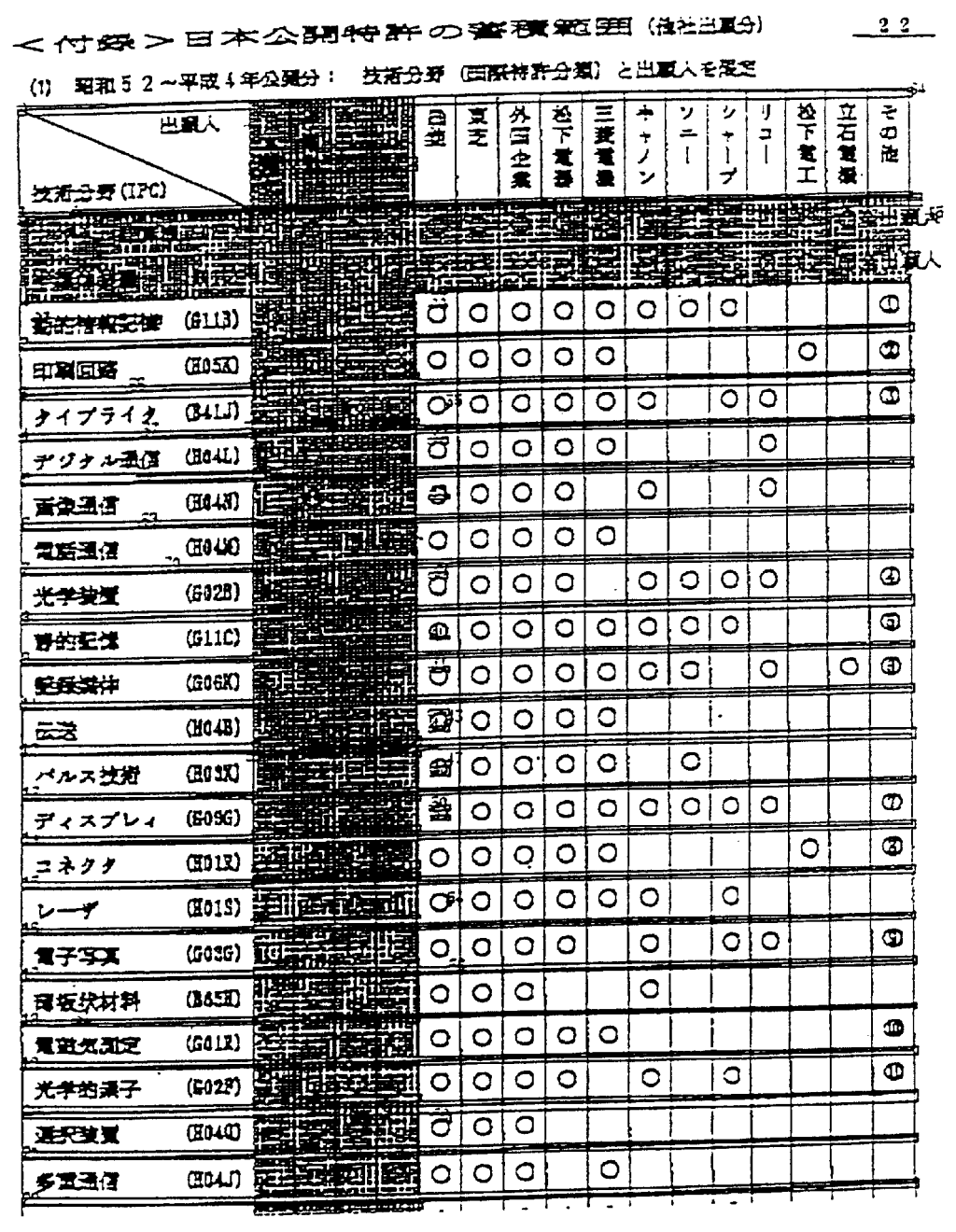
Figure 26:
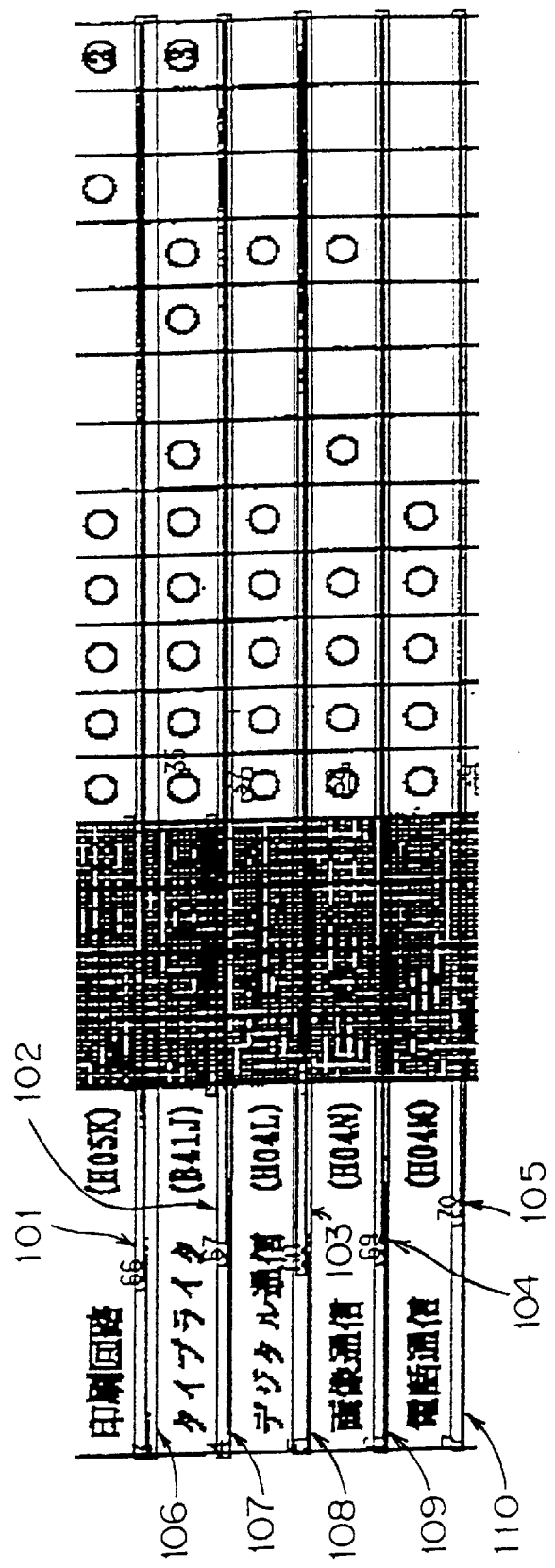
FIG. 26 is a schematic diagram showing an image before a process for integrating straight lines which completely overlap is performed.

FIG. 25 shows the image data after the horizontal segments are integrated in the process P4. FIG. 26 shows part of the image shown in FIG. 25. The state shown in FIG. 26 corresponds to the image data before the straight lines which completely overlap are integrated in the process P16, while FIG. 27 shows the image data after they are integrated.

Figure 27:
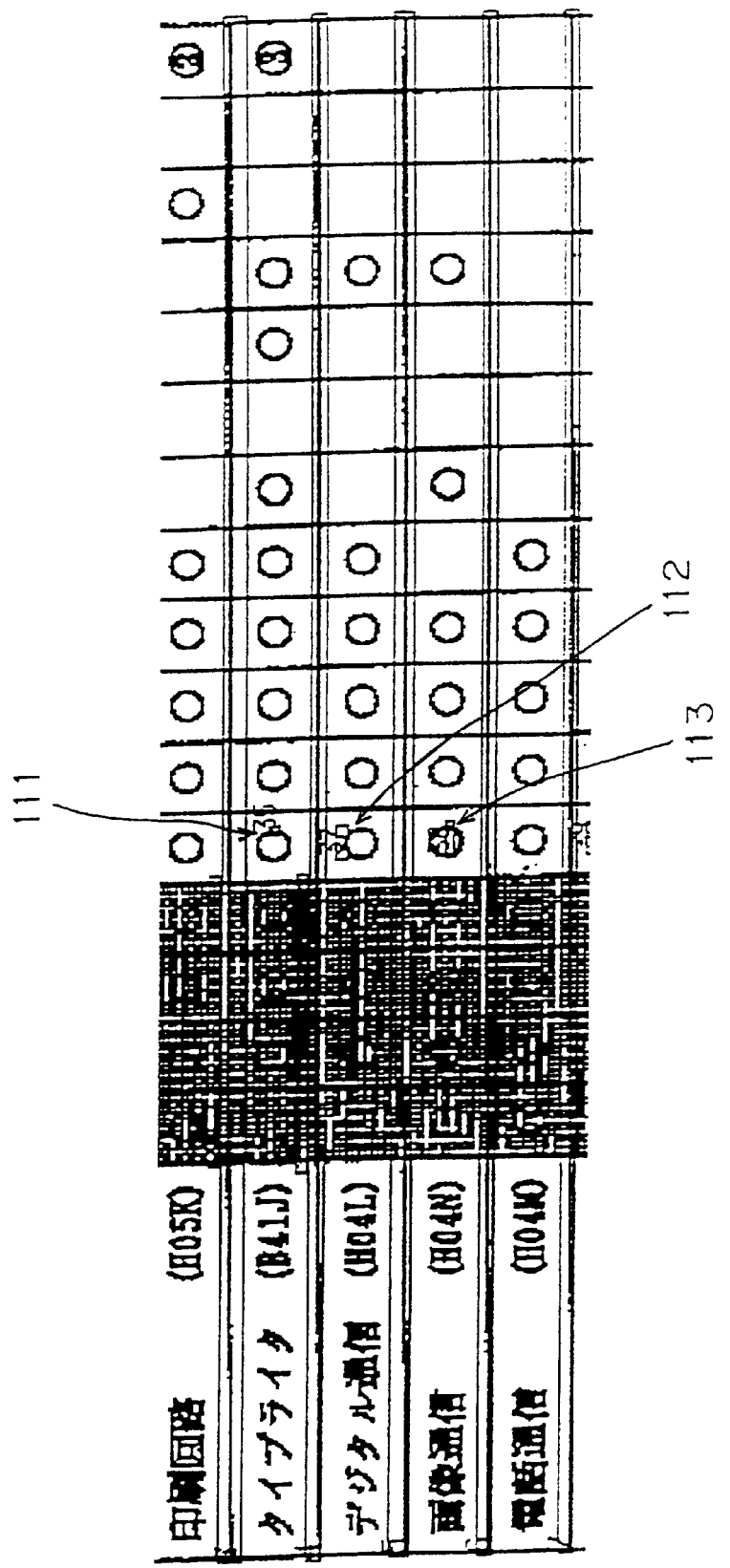
FIG. 27 is a schematic diagram showing an image after the process for integrating straight lines which completely overlap is performed.

It is known that the straight line rectangle 101 having the label 66 and the straight line rectangle 106 having the label 3, which are shown in FIG. 26, are integrated into one in FIG. 27. Similarly, the straight line rectangles 102, 103, 104, and 105 having the labels 67, 68, 69, and 70 are respectively integrated with the straight line rectangles 107, 108, 109, and 110 having the labels 4, 5, 6, and 7.

FIG. 28 shows the image data generated by performing the processes P17 and P18 for the image shown in FIG. 27, and deleting a straight line based on the shape, position, and link relationship of the straight line. It is known from FIG. 28 that the straight line rectangles 111, 112, and 113 having the labels 35, 37, and 38, which are shown in FIG. 27, are deleted.

Figure 29:
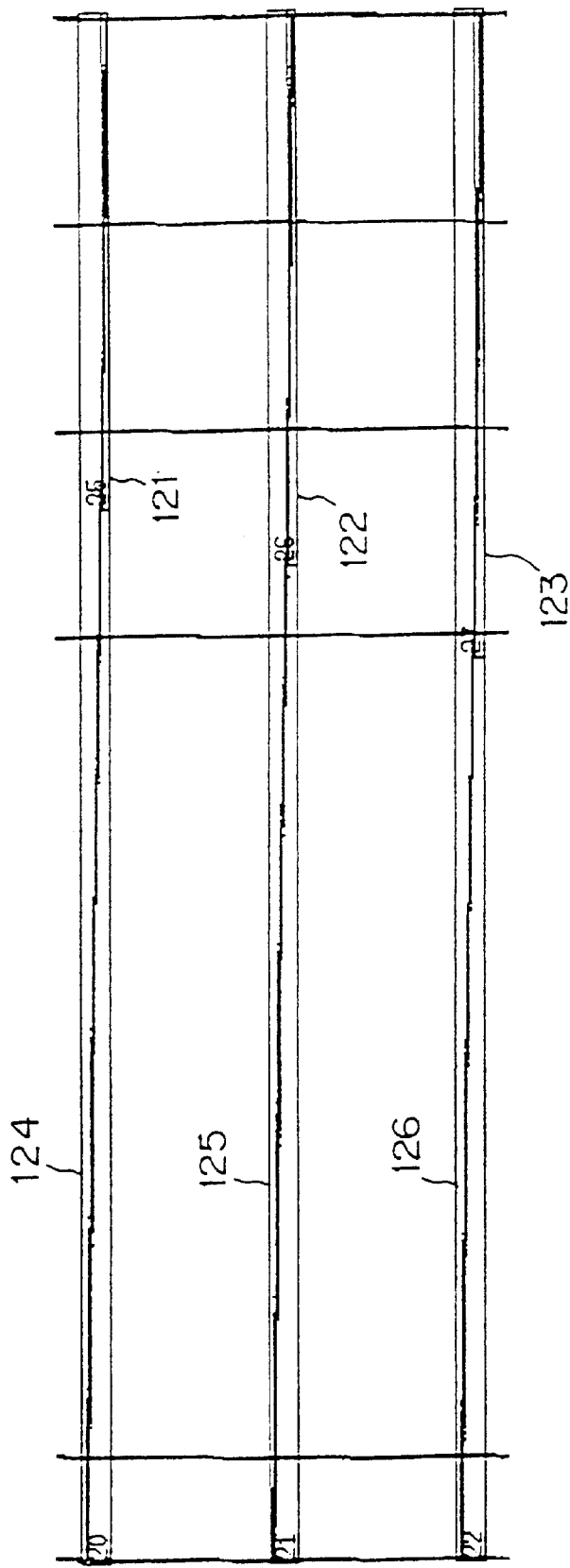
FIG. 29 shows an image before the process for integrating straight lines which partially overlap is performed.
Figure 30:
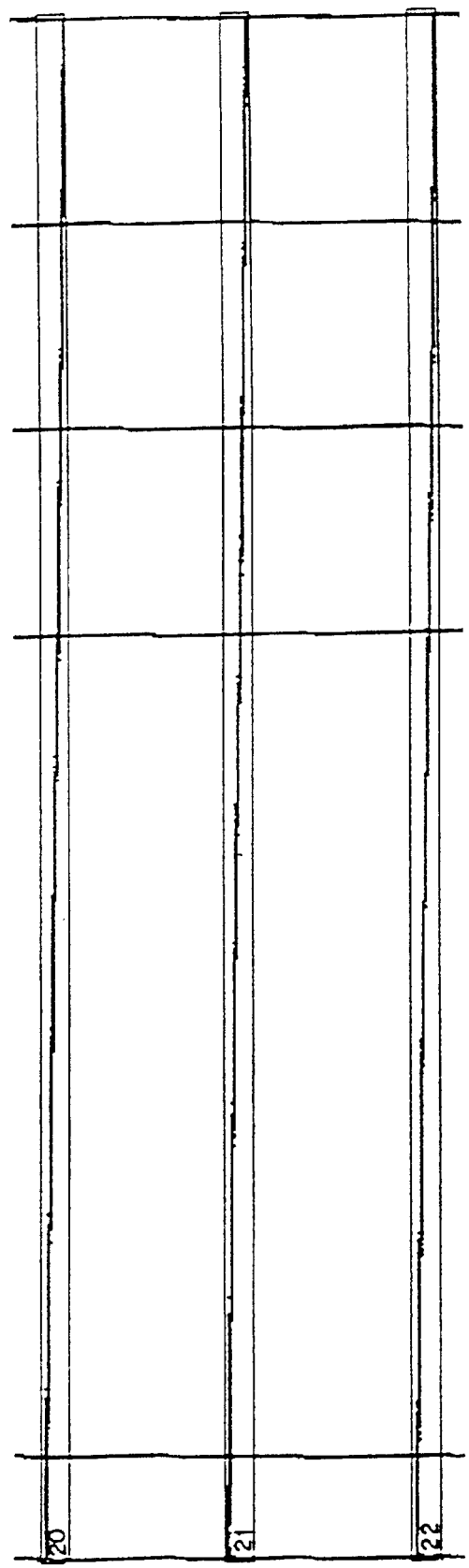
FIG. 30 shows an image after the process for integrating straight lines which partially overlap is performed.

FIG. 29 shows the image data before the straight lines which partially overlap are integrated in the process P19, while FIG. 30 shows the image data after they are integrated. It is known from FIG. 30 that the straight line rectangle 121 having the label 25 and the straight line rectangle 124 having the label 20, which are shown in FIG. 29, are integrated into one. Similarly, the straight line rectangles 122 and 123 having the labels 26 and 27 are respectively integrated with the straight line rectangles 125 and 126 having the labels 21 and 22.

Figure 31:
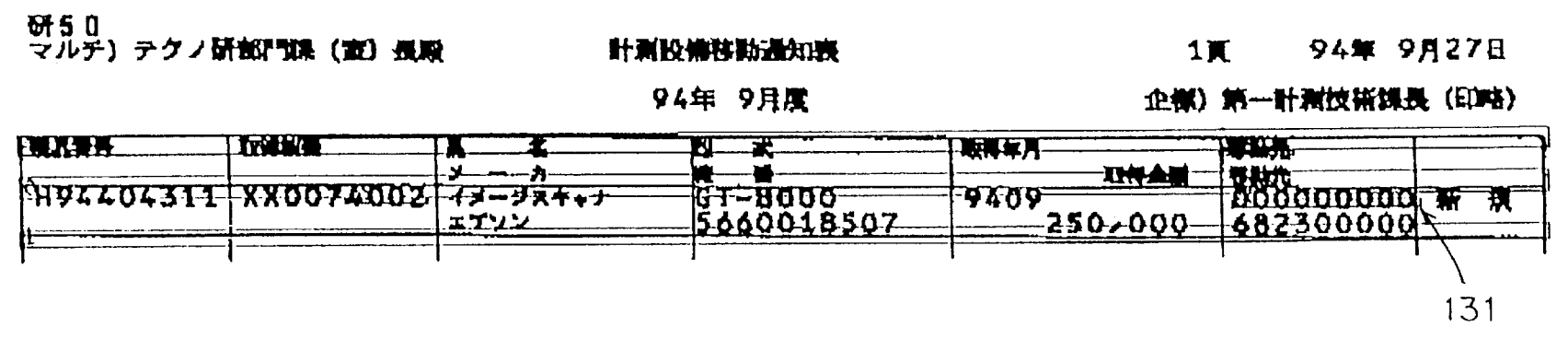
Figure 32:
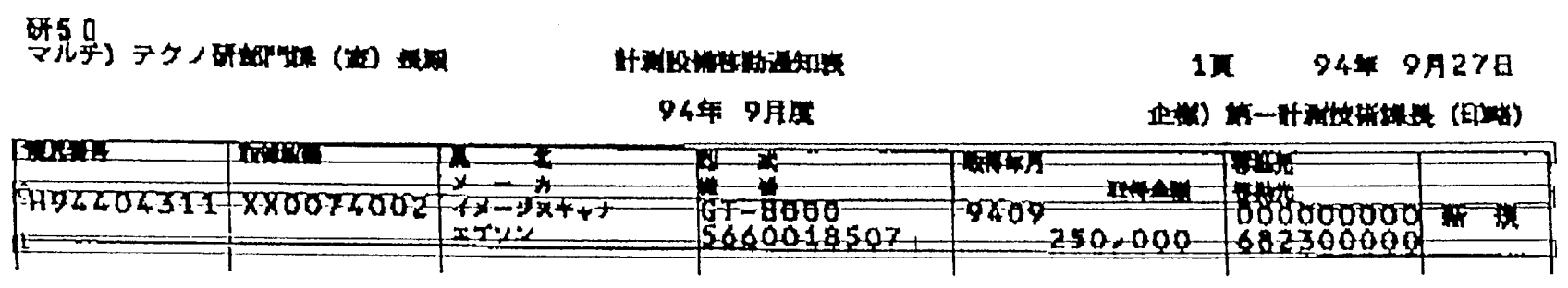

FIG. 31 shows the image data before the straight lines which almost completely overlap are deleted in the process P20, while FIG. 32 shows the image data after they are deleted. It is known from FIG. 32 that the straight line rectangle 131 shown in FIG. 31 is deleted.

Figure 33:
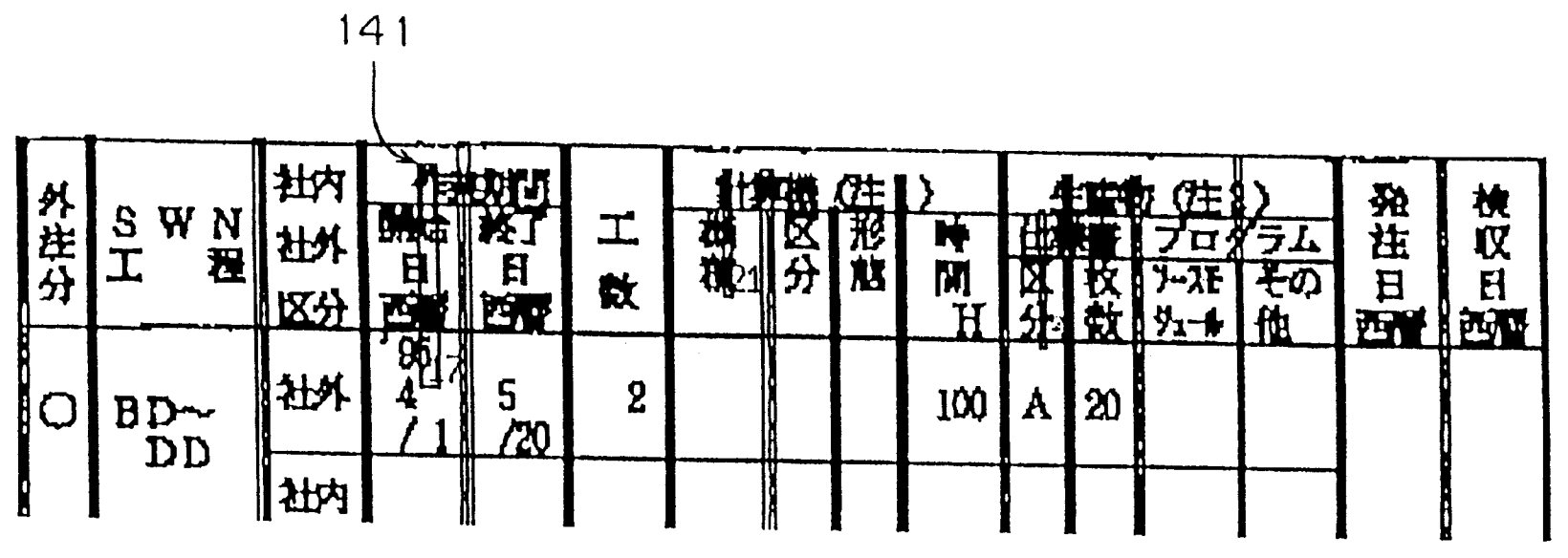

Additionally, FIG. 33 shows the image data before the straight line composed of the large segments is deleted in the process P21, while FIG. 34 shows the image data after it is deleted. It is known from FIG. 34 that the straight line rectangle 141 shown in FIG. 33 is deleted.

Figure 35:
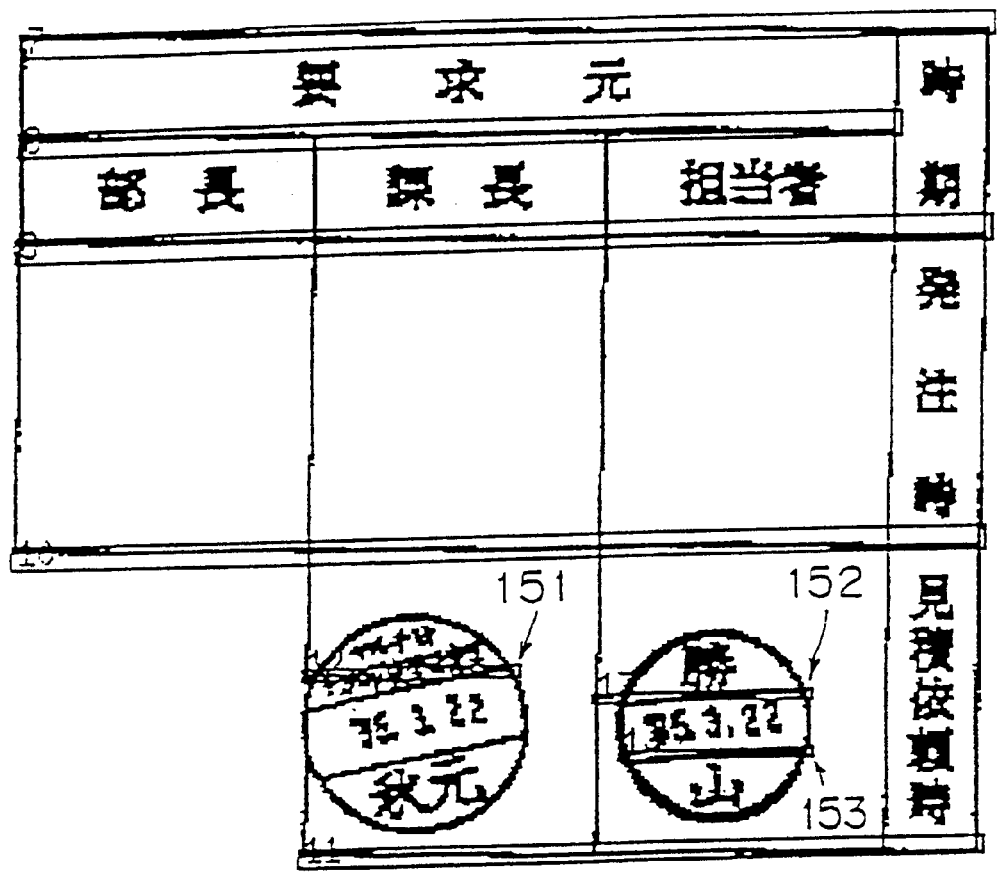
FIG. 35 shows an image before a process for checking/deleting a straight line using a segment shift, is performed.
Figure 36:
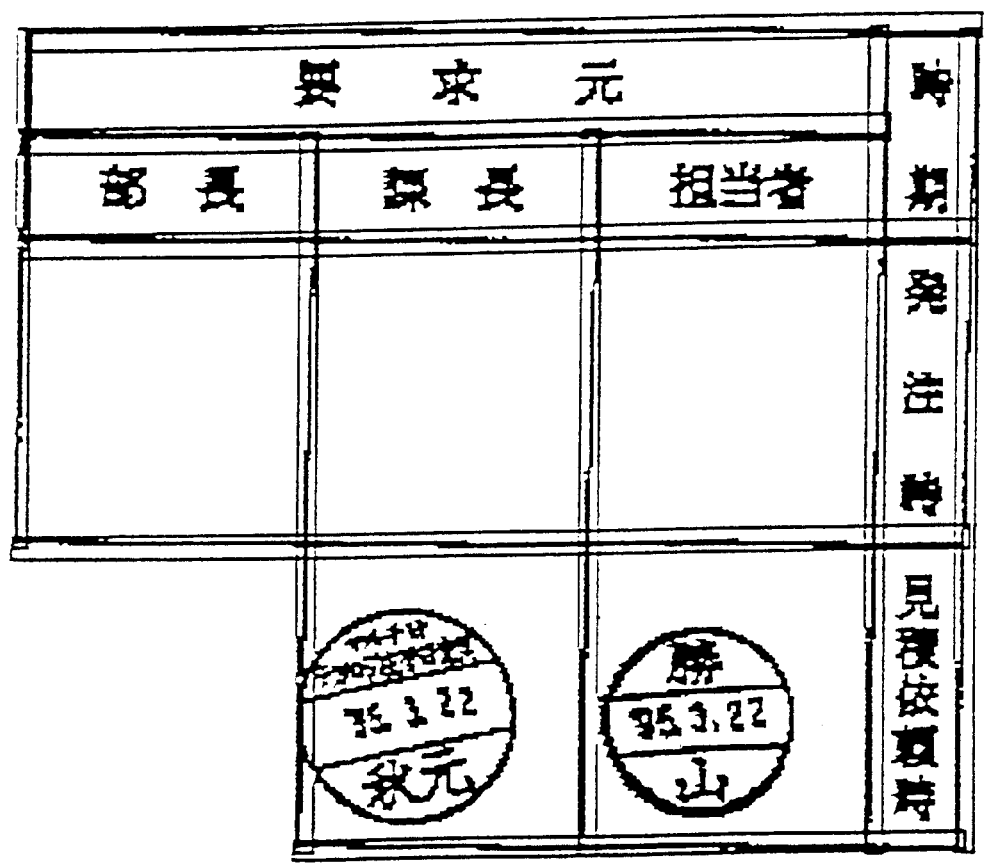
FIG. 36 shows an image after the process for checking/deleting a straight line using the segment shift, is performed.

Furthermore, FIG. 35 shows the image data before a straight line is checked/deleted using a segment shift in the process P23, while FIG. 36 shows the image data after it is checked/deleted. It is known from FIG. 36 that the straight line rectangles 151, 152, and 153 shown in FIG. 35 are deleted.

Provided next is the explanation about the details of the process for integrating segments, by referring to FIGS. 37 through 41. FIGS. 37, 38, 39, 40, and 41 are flowcharts showing the process P4 for integrating horizontal segments, which is shown in FIG. 2B.

With this process, the horizontal straight line extracting unit 15 handles a large cluster of black pixels as a wild card rectangle, and targets horizontally long segment rectangles concatenated in eight directions before and after the wild card rectangle. The horizontal straight line extracting unit 15 then integrates segment rectangles in a concatenation relationship in eight directions through the wild card rectangle into one horizontally long rectangle as a horizontal straight line.

Once the process is started, the horizontal straight line extracting unit 15 first calculates each threshold value in the following equations using the most frequent value "mfheight_small" of the heights of horizontal segments, and sets the number of straight lines to "0" (step S1 of FIG. 37).

$$th\_height = mfheight\_small + TH\_HEIGHTDOT \quad (3)$$

$$standard\_h = mfheight\_small + 1 \quad (4)$$

Here, the value of TH_HEIGHTDOT is set to, for example "2". Next, one of the heights of the segment rectangles to be mutually concatenated is examined (step S2). If it is greater than the threshold value "th_height", it is marked as a wild card rectangle (step S3). At this time, the wild card attribute is attached by setting an identification variable "use" of the attribute information of the segment rectangle to "9".

For the other segment rectangles, "use" is set to "0", as a standard rectangle (step S4). Then, it is determined whether or not all of the segment rectangles to be concatenated are processed (step S5). If a segment rectangle is left to be processed, the process in and after step S2 is repeated.

After all of the segment rectangles are processed, one of them is extracted as a current rectangle "i". the leftmost coordinate of the current rectangle "i" is assigned to "xlf"; the rightmost coordinate of the current rectangle "i" is assigned to "xr"; the uppermost coordinate of the current rectangle "i" is assigned to "yup"; the lowermost coordinate of the current rectangle "i" is assigned to "ybl"; "line_start" is set to "yup"; and "line_end" is set to "ybl" (step S6). Then, it is determined whether "use" of the current rectangle "i" is either "0" or "9" (step S7).

If the "use" of the current rectangle "i" is either "0" or "9", "startxlf" is set to "xlf"; "startxr" is set to "xr"; "startyup" is set to "yup"; and "startybl" is set to "ybl" (step S8). Next, it is determined whether or not "use" is "0" (step S9 of FIG. 38). If "use" is 0, "standard_st" is set to "yup"; "standard_en" is set to "ybl"; "b_use" is set to "0"; "use" is set to "1"; and "height" is set to "ybl−yup+1" (step S10). "b_use=0" indicates that the current rectangle "i" is not a wild card rectangle but a standard rectangle. "use=1" indicates that the current rectangle "i" has been used. If "use" is not "0" in step S9, "standard_st" is set to "0"; "standard_en" is set to "0"; "b_use" is set to "9"; and "height2" is set to "ybl−yup+1" (step S11). "b_use=9" indicates that the current rectangle "i" is not set as a standard rectangle since it is a wild card rectangle.

Next, another segment rectangle is extracted as a current rectangle "k". The leftmost coordinate of the current rectangle "k" is then assigned to "rxlf"; the rightmost coordinate of the current rectangle "k" is assigned to "rxr"; the uppermost coordinate of the current rectangle "k" is assigned to "ryup"; and the lowermost coordinate of the current rectangle "k" is assigned to "rybl" (step S12).

It is determined whether or not the current rectangle "i" is set as a standard rectangle, that is, whether or not b_use is set to "0" (step S13). If "b_use" is "0", it is determined whether or not "use" of the current rectangle "k" is "9" (step S14). "use=9" indicates that the current rectangle "i" is a standard rectangle, and the current rectangle "k" is a wild card rectangle.

If "use" is "9", it is determined whether or not "xr+1≧rxlf", "xr<rxr", "ybl+1≧ryup", and "yup−1≦rybl" are satisfied (step S15). If these conditions are satisfied, it means that the current rectangle "k" is located on the right side of the current rectangle "i", and both of them possess an overlapping portion of one or more pixels horizontally and vertically. Therefore, "xr" is set to "rxr", and the right edge of the current rectangle "i" is extended to that of the current rectangle "k" (step S16).

Figure 39:
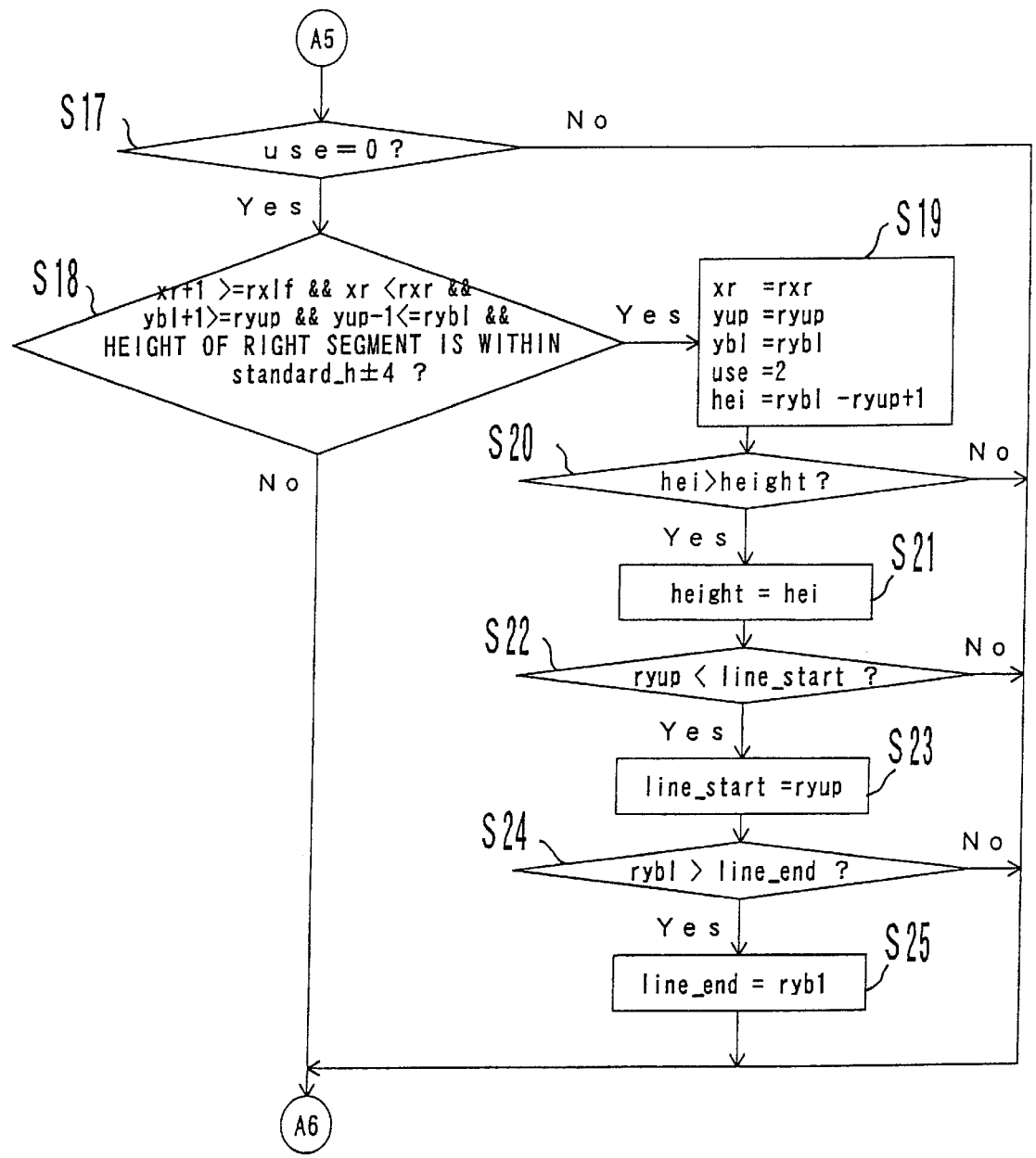
FIG. 39 is a flowchart 3 showing the process for integrating segments.

If "use" is not "9" in step S14, it is then determined whether or not "use" is "0" (step S17 of FIG. 39). If "use" is "0", it means that the current rectangle "i" is a standard rectangle, and the current rectangle "k" is not a wild card rectangle. Next, it is determined whether or not xr+1≧rxlf, xr<rxr, ybl+1≧ryup, and yup−1≦rybl are satisfied and whether or not the height of the current rectangle "k" is equal to or less than "standard_h+/−4" (step S18).

If these conditions are satisfied, "xr" is set to "rxr"; "yup" is set to "ryup"; "ybl" is set to "rybl"; "use" is set to "2"; and "hei" is set to "rybl−ryup+1" (step S19). This means that the right edge of the current rectangle "i" is extended to the right edge of the current rectangle "k", and the uppermost and lowermost coordinates are replaced with those of the current rectangle "k". "use=2" indicates that the current rectangle "k" has been used.

Next, it is determined whether or not "hei>height" is satisfied (step S20). If "YES", "height" is set to "hei" (step S21). It is then determined whether or not "ryup<line_start" is satisfied (step S22). If "YES", "line_start" is set to "ryup" (step S23). It is determined whether or not "rybl>line_end" is satisfied (step S24). If "YES", "line_end" is set to "rybl" (step S25).

Figure 40:
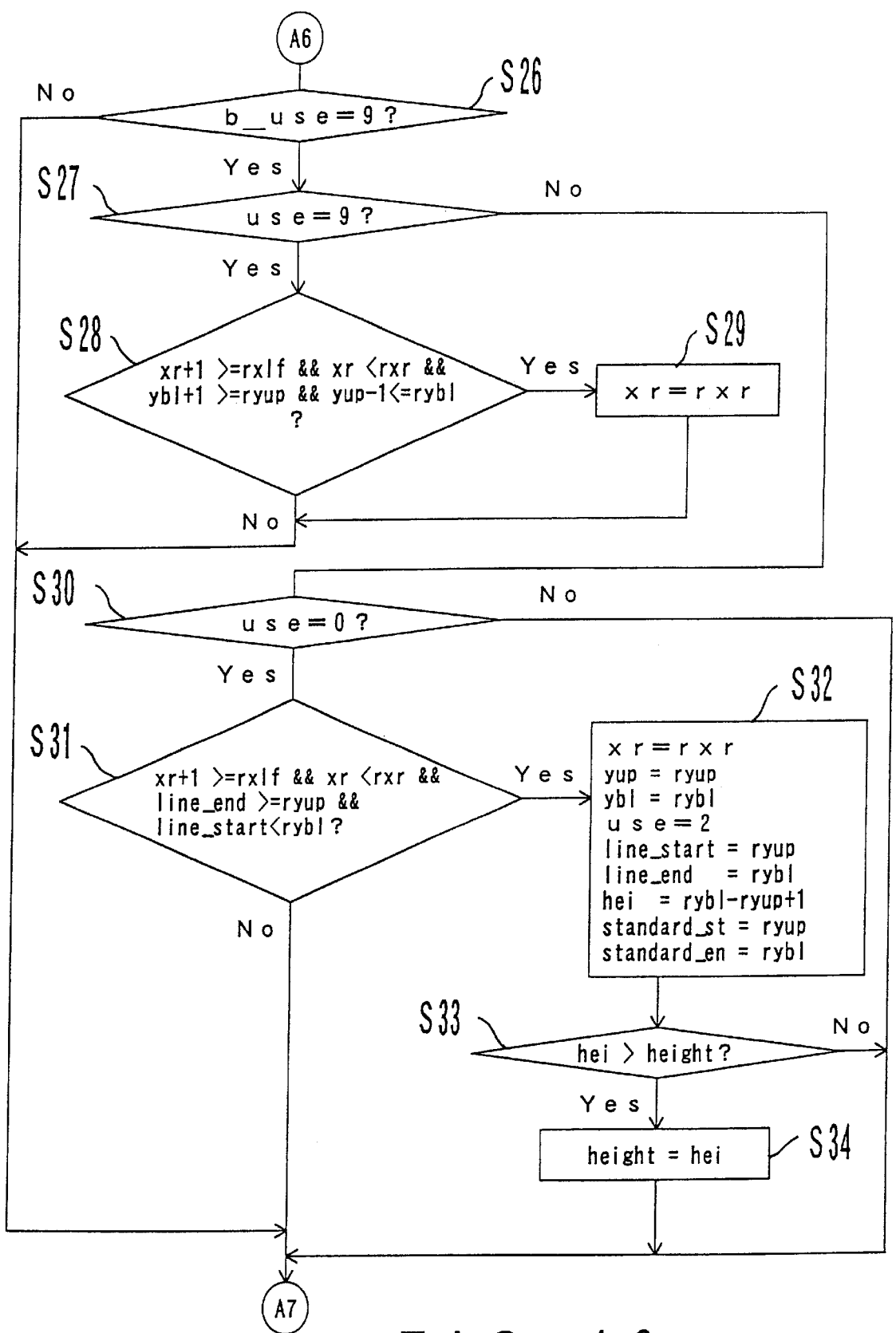
FIG. 40 is a flowchart 4 showing the process for integrating segments.

After these operations are performed, it is determined whether or not "b_use" is "9" (step S26 of FIG. 40). If the result of the determination is "NO" in steps S13 and S15 of FIG. 38 and in steps S18, S20, S22, and S24 of FIG. 39, the process in and after step S26 is immediately performed.

If "b_use" is "9", it is determined whether or not "use" of the current rectangle "k" is "9" (step S27). If "YES", it indicates that both of the current rectangles "i" and "k" are wild card rectangles. Then, it is determined whether or not "xr+1≧rxlf", "xr≦rxr", "ybl+1≧ryup", and "yup−1≦rybl" are satisfied (step S28).

If these conditions are satisfied, the current rectangle "k" is located on the right side of the current rectangle "i", and both of them possess an overlapping portion of one or more pixels horizontally and vertically. Accordingly, "xr" is set to "rxr", and the right edge of the current rectangle "i" is extended to that of the current rectangle "k" (step S29).

If "use" is not "9" in step S27, it is determined whether or not "use" is equal to "0" (step S30). If "YES", it indicates that the current rectangle "i" is a wild card rectangle, and the current rectangle "k" is not a wild card rectangle. Then, it is determined whether or not "xr+1≧rxlf", "xr<rxr", "line_end≧ryup", and "line_start<rybl" are satisfied (step S31).

If these conditions are satisfied, "xr" is set to "rxr"; "yup" is set to "ryup"; "ybl" is set to "rybl"; "use" is set to "2"; "line_start" is set to "ryup"; "line_end" is set to "rybl"; "hei" is set to "rybl−ryup+1"; "standard_st" is set to "ryup"; and "standard_en" is set to "rybl" (step S32).

This means that the right edge of the current rectangle "i" is extended to that of the current rectangle "k", and the uppermost and lowermost coordinates are replaced with those of the current rectangle "k". Furthermore, "use=2" indicates that the current rectangle "k" has been used. Then, it is determined whether or not "hei>height" is satisfied (step S33). If "YES", "height" is set to "hei" (step S34).

Figure 38:
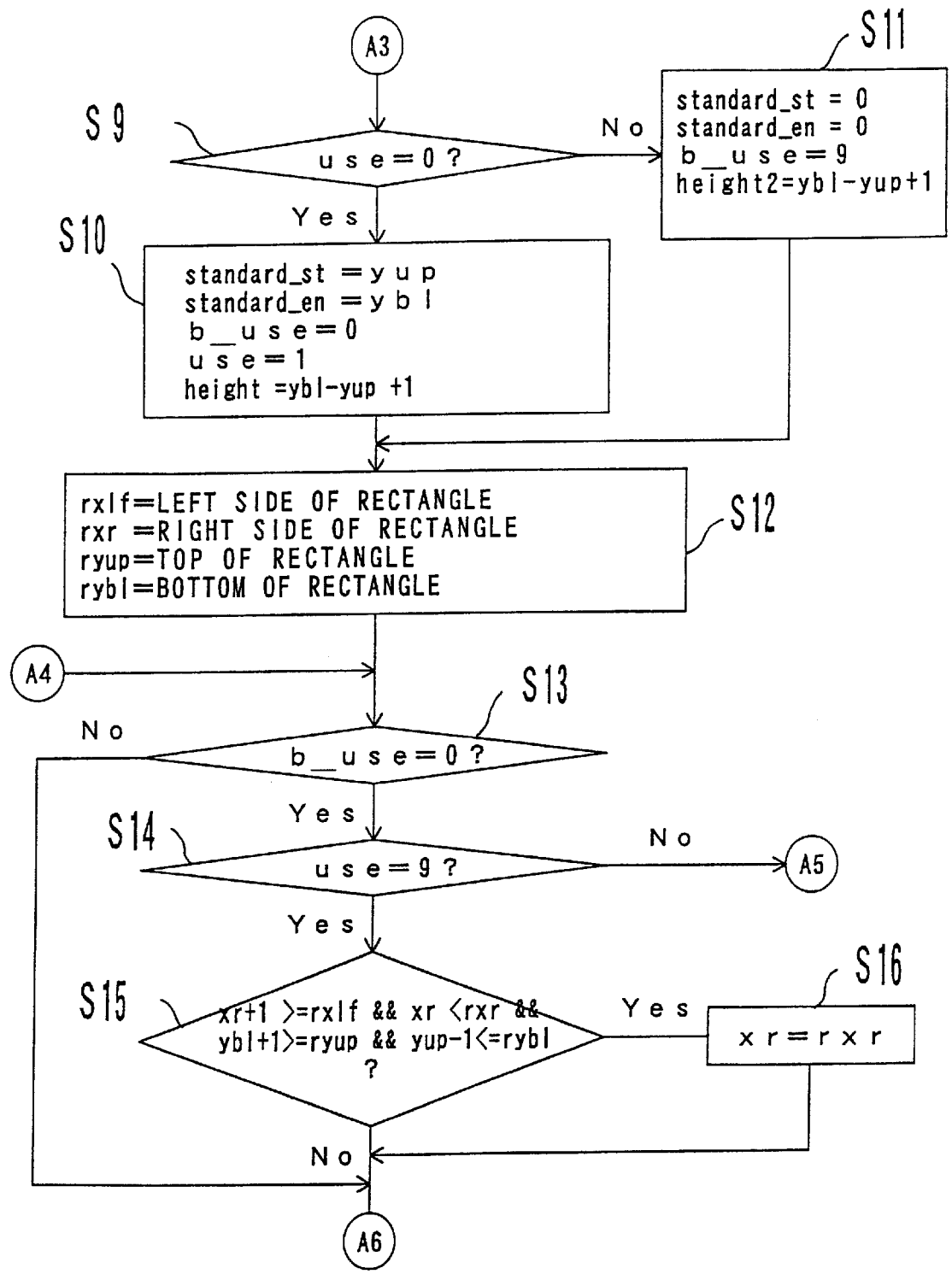
FIG. 38 is a flowchart 2 showing the process for integrating segments.
Figure 41:
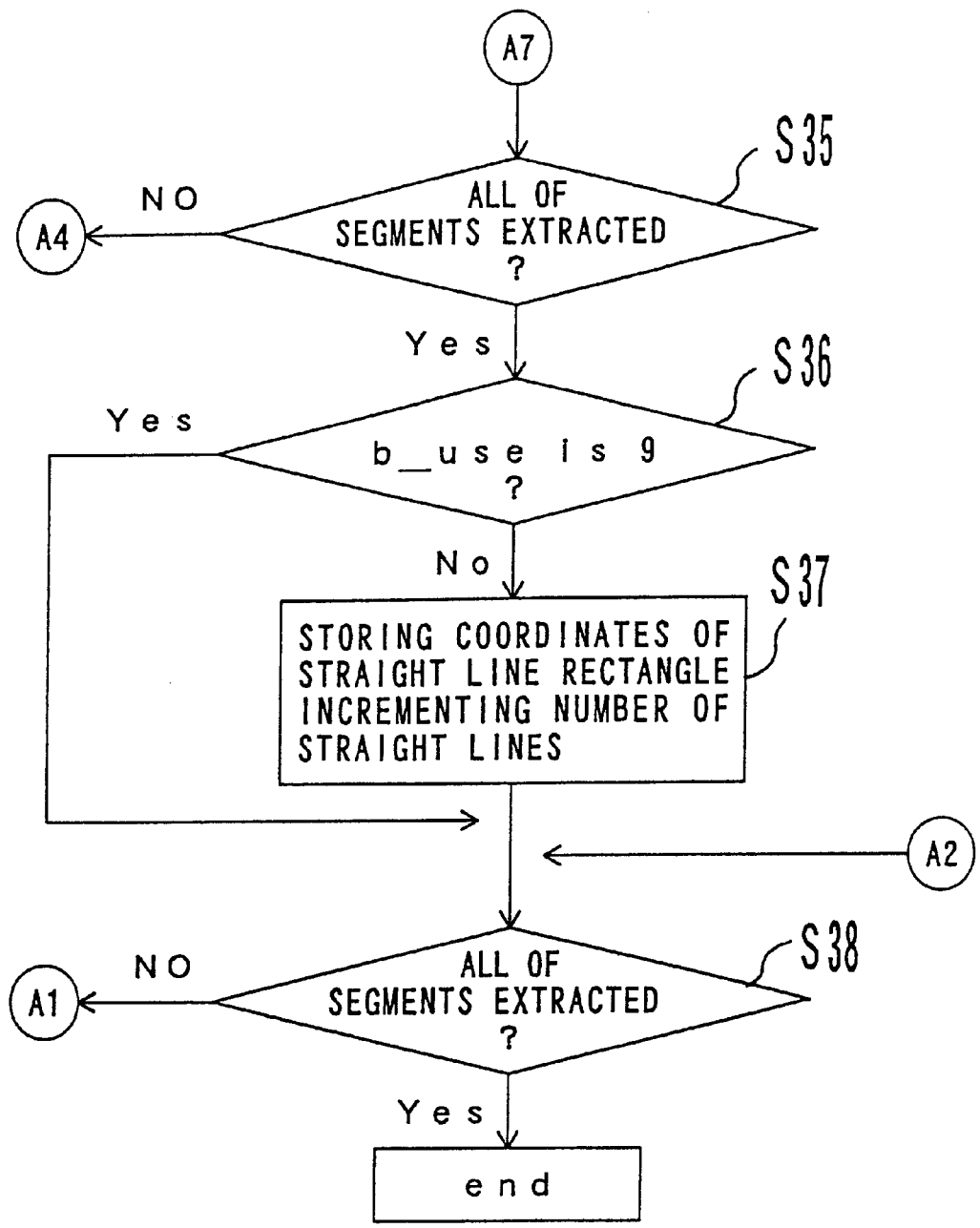
FIG. 41 is a flowchart 5 showing the process for integrating segments.

Next, it is determined whether or not all of segment rectangles to be concatenated are extracted as the current rectangle "k" (step S35 of FIG. 41). If the result of the determination is "NO" in steps S26, S28, S30, S31, and S33 of FIG. 40, the process in and after S35 is immediately performed. If any segment rectangle is left to be extracted, the process in and after step S13 of FIG. 38 is repeated.

If the process is completed for all of the segment rectangles, it is determined whether or not "b_use" is set to "9" (step S36). If "NO", "xlf", "xr", "line_start", and "line_end" are respectively stored as the leftmost, rightmost, uppermost, and lowermost coordinates of an extracted straight line rectangle, and the number of straight lines is incremented by 1 (step S37).

If "b_use" is "9" in step S36, it indicates that the current rectangle "i" and all of its concatenated rectangles are wild cards. In this case, they are not stored as a straight line.

Next, it is determined whether or not all of the segment rectangles are extracted as the current rectangle "i" (step S38). If any segment rectangle is left to be extracted, the process in and after step S6 of FIG. 37 is repeated. If "use" of the current rectangle "i" is neither 0 nor 9, it indicates that the extracted segment rectangle was previously used. Therefore, the process in step S38 is immediately performed to extract the next segment rectangle. After all of the segment rectangles are extracted, the process is terminated.

As described above, a wild card is skipped, and horizontal segment rectangles on its both sides are integrated, thereby extracting a horizontal straight line including only standard segments. The process for integrating vertical segments, which is shown in FIG. 2B, is performed according to a similar flow.

Provided next is the explanation about the details of the flow of the process for checking/deleting a straight line using a segment shift, by referring to FIGS. 42 through 47. FIGS. 42, 43, 44, 45, 46, and 47 are flowcharts showing the process for checking/deleting a horizontal straight line in the process P23 shown in FIG. 2B. With this process, the ruled line extracting apparatus determines whether or not a straight line is a correct ruled line based on the distribution of black pixels around each horizontal straight line, leaves only a correct ruled line, and deletes the other lines.

Figure 42:
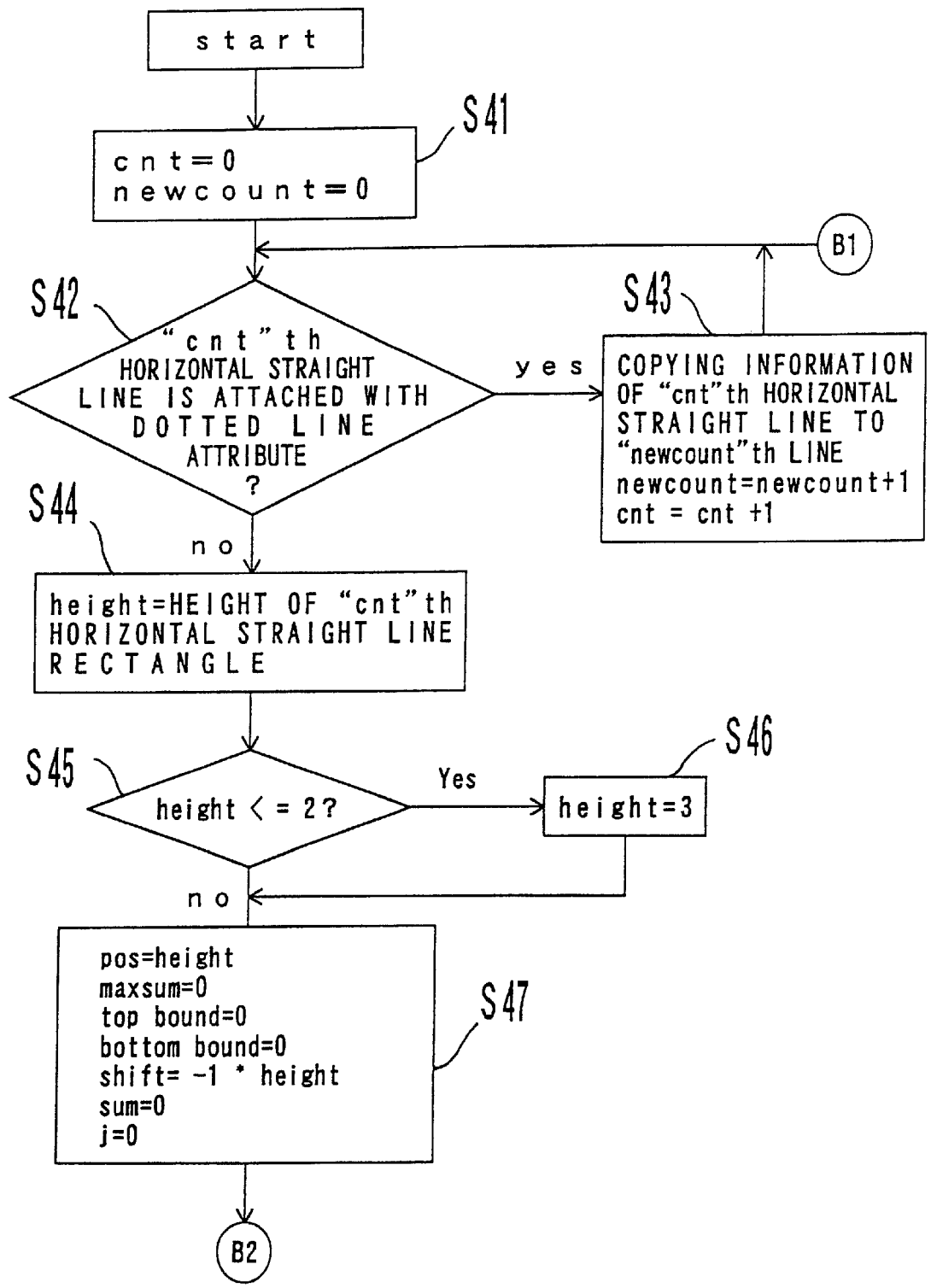
FIG. 42 is a flowchart 1 showing the process for checking/deleting a straight line.

Once the process is started, the ruled line extracting apparatus assigns the value "0" to both a variable "cnt" indicating the number of processed horizontal straight lines, and a variable "newcount" indicating the number of horizontal straight lines which have been determined to be correct ruled lines (step S41 of FIG. 42). Note that, therefore, the count operations for "cnt" and "newcount" start from "0".

Next, it is determined whether or not the attribute of a "cnt"th horizontal straight line represents a dotted line (step S42). If it is the dotted line attribute, the entire straight line information of the horizontal straight line is copied as the information of a "newcount"th ruled line, and the variables "cnt" and "newcount" are respectively incremented by 1 (step S43). In step S42, the determination of the next horizontal straight line is made.

If the attribute of the "cnt"th straight line is not the dotted line attribute, it is recognized to correspond to a solid line, and the height of the horizontal straight line rectangle is defined as "height" (step S44). Next, it is determined whether or not "height" is equal to or less than "2" (step S45). If the value of "height" is larger than "2", it is not changed. If it is equal to or less than "2", it is changed to "3" (step S46).

Then, "pos" is set to "height"; "maxsum" is set to "0"; "top_bound" is set to "0"; "bottom_bound" is set to "0"; "shift" is set to "−1*height"; "sum" is set to "0"; and "j" is set to "0" (step S47). The variable "pos" is used to specify the position in the upward or downward direction in an image. The variable "maxsum" indicates the maximum value in a graph representing the total number of black pixels.

Furthermore, the variable top_bound is used as a flag indicating whether or not a section of a graph has reached the top of an image, while the variable bottom_bound is used as a flag indicating whether or not the section of the graph has reached the bottom of the image. The value of the variable "shift" indicates the amount of shift in the upward or downward direction of segment rectangles included in a horizontal straight line. The variable "sum" indicates the total number of black pixels included in the segment rectangles.

Figure 43:
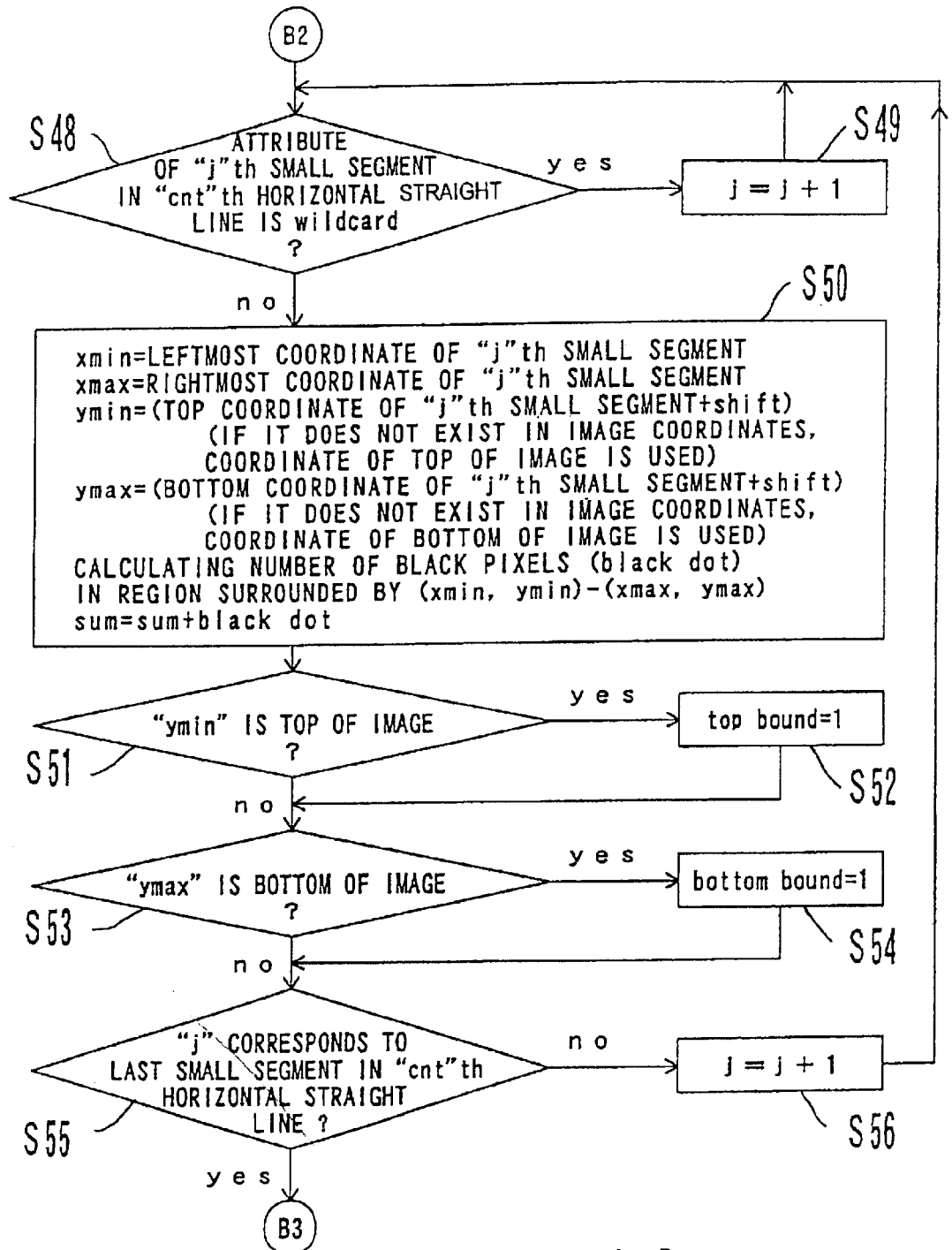
FIG. 43 is a flowchart 2 showing the process for checking/deleting a straight line.
Figure 44:
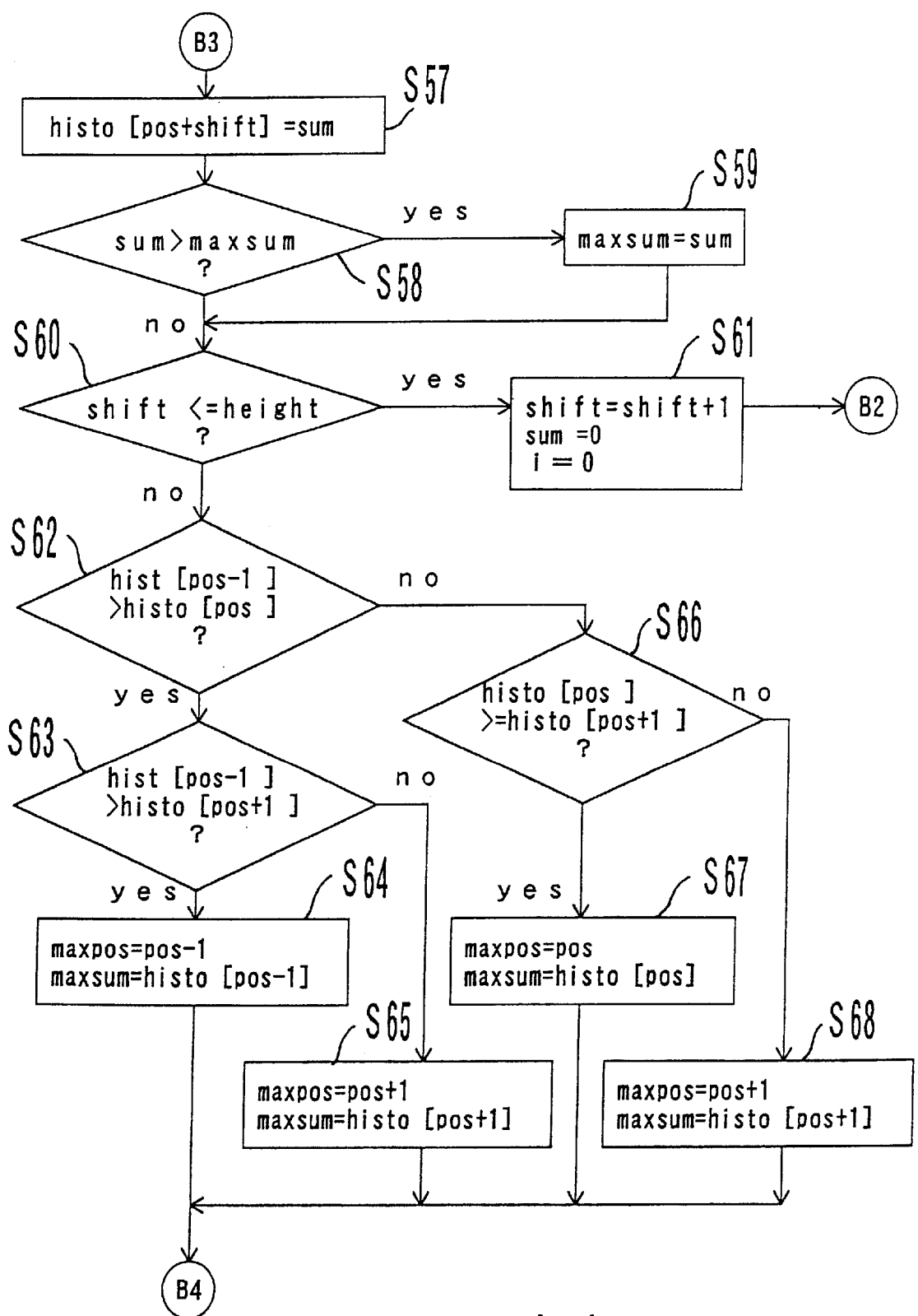
FIG. 44 is a flowchart 3 showing the process for checking/deleting a straight line.

Next, it is determined whether or not the attribute of a "j"th small segment (segment rectangle) included in the "cnt"th horizontal straight line is a wild card (step S48 of FIG. 43). If "YES", the value of "j" is incremented by 1 (step S49), and the next small segment is checked in step S48.

If the attribute of the "j"th small segment is not a wild card, it is recognized to correspond to a normal segment rectangle, the leftmost coordinate of the "j"th small segment is assigned to "xmin"; the rightmost coordinate of the "j"th small segment is assigned to "xmax"; "the uppermost coordinate of the "j"th small segment+shift" is assigned to "ymin"; and "the lowermost coordinate of the "j"th small segment+shift" is assigned to "ymax" (step S50). Note that, however, if the position of "ymin" or "ymax" so determined is not included in the coordinates of an image, the value of the y coordinate closest to the top or bottom of the image is recognized as "ymin" or "ymax".

Then, the number of black pixels in a rectangular region partitioned by each of the values of the variables "xmin", "xmax", "ymin", and "ymax", is calculated, and defined as "black_dot". Then, "sum+black_dot" is assigned to "sum".

Next, it is determined whether or not "ymin" corresponds to the top of the image (step S51). If "YES", "top_bound" is set to "1" (step S52). Additionally, it is determined whether or not "ymax" corresponds to the bottom of the image (step S53). If "YES", "bottom_bound" is set to "1" (step S54).

Then, it is determined whether or not the value of the variable "j" corresponds to the last small segment in the "cnt"th horizontal straight line (step S55). If the result of the determination is "NO", the value of "j" is incremented by 1 (step S56), and the process in and after step S48 is repeated. If "YES", "histo[pos+shift]" is set to "sum" (step S57 of FIG. 44).

Here, "histo[p]" indicates the value (total number of black pixels) of the graph corresponding to the value of a positional parameter "p" in the y direction. Assuming that "pos" is set to "height", and "shift" is set to "−height", "histo[pos+shift]" will be "histo[0]", which indicates the value of the graph corresponding to the position of the parameter value "0".

Next, the comparison between "sum" and "maxsum" is made (step S58). if "sum" is larger than "maxsum", "maxsum" is set to "sum" (step S59).

Then, the comparison between "shift" and "height" is made (step S60). If "shift" is equal to or smaller than "height", "shift" is set to "shift+1", "sum" and "j" are reset to the initial value "0" (step S61), and the process in and after step S48 is repeated. In this way, the value in a graph corresponding to the position at which the amount of shift is changed by 1 pixel, is calculated.

If the value of "shift" exceeds that of "height", the comparison between "histo[pos−1]" and "histo[pos]" is made (step S62). Here, "histo[pos]" indicates the value of the graph corresponding to the position of the amount of shift "0". If "histo[pos−1]" is larger than "histo[pos]", the comparison between "histo[pos−1]" and "histo[pos+1]" is made (step S63).

If "histo[pos−1]" is larger than "histo[pos+1]", "maxpos" is set to "pos−1", and "maxsum" is set to "histo[pos−1]" (step S64). If "histo[pos−1]" is equal to or smaller than "histo[pos+1]", "maxpos" is set to "pos+1"; and "maxsum" is set to "histo[pos+1]" (step S65).

If "histo[pos−1]" is equal to or smaller than "histo[pos]" in step S62, the comparison between "histo[pos]" and "histo[pos+1]" is made (step S66).

If "histo[pos]" is equal to or larger than "histo[pos+1]", "maxpos" is set to "pos", and "maxsum" is set to "histo[pos]" (step S67). If "histo[pos]" is smaller than "histo[pos+

1]", "maxpos" is set to "pos+1", and "maxsum" is set to "histo[pos+1]" (step S68).

With such a process, the maximum value among "histo[pos−1]", "histo[pos]", and "histo[pos+1]" is assigned to "maxsum", and the corresponding parameter value is assigned to "maxpos". Accordingly, "maxsum" indicates the maximum value of the graph close to the position of the amount of shift "0". It corresponds to "Peak" shown in FIG. 24.

Next, a threshold value "th" is calculated using the obtained value of "maxsum(=histo[maxpos])" according to the following equation (step S69 of FIG. 45):

$$th = maxsum * THSHIFT \qquad (5)$$

Here, the parameter "THSHIFT" indicates the ratio of the threshold value "th" to the maximum value "maxsum". It is set to a suitable value between 0 and 1.0.

Then, "lineokflag1" is set to "0"; "lineokflag2" is set to "0"; "minval" is set to "0xffff"; and "shift" is set to "−1*height". The variables "lineokflag1" and "lineokflag2" are used as the flags representing the result of checking in both of the portions which are higher and lower than the position corresponding to the maximum value. The variable "minval" indicates the minimum value of a graph.

Next, the comparison between "histo[pos+shift]" and "th" is made (step S70). If "histo[pos+shift]" is smaller than "th", the number of black pixels is recognized to decrease in the portion which is higher than the position corresponding to the maximum value, and "lineokflag1" is set to "1" (step S71). Accordingly, "lineokflag1=1" indicates that the result of the checking in the upper portion is "OK".

Then, the comparison between "histo[pos+shift]" and "minval" is made (step S72). If "histo[pos+shift]" is smaller than "minval", "minval" is set to "histo[pos+shift]" (step S73).

The comparison between (pos+shift) and "maxpos" is made (step S74). If "(pos+shift)" is equal to or smaller than "maxpos", "shift" is set to "shift+1" (step S75), and the process in and after step S70 is repeated. With this process, the value of the graph is re-examined at the position where the amount of shift is changed by one pixel.

Figure 46:
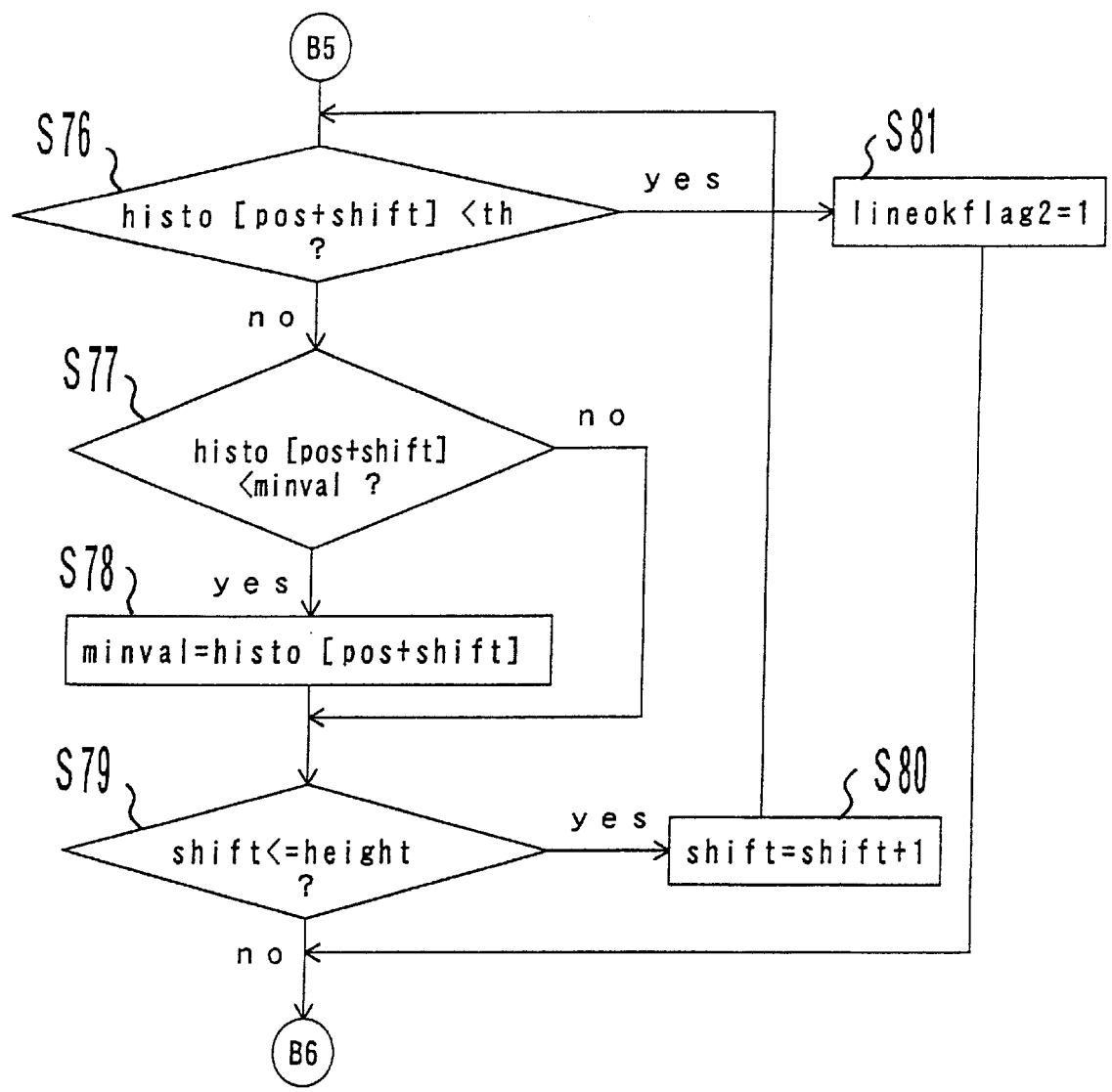
FIG. 46 is a flowchart 5 showing the process for checking/deleting a straight line.

If "(pos+shift)" is larger than "maxpos", the comparison between "histo[pos+shift]" and "th" is made (step S76 of FIG. 46). If "histo[pos+shift]" is equal to or larger than "th", the comparison between "histo[pos+shift]" and "minval" is made (step S77). If "histo[pos+shift]" is smaller than "minval", "minval" is set to "histo[pos+shift]" (step S78).

Next, the comparison between "shift" and "height" is made (step S79). If "shift" is equal to or smaller than "height", "shift" is set to "shift+1" (step S80), and the process in and after S76 is repeated. With this process, the value of the graph is re-examined at the position where the amount of shift is changed by one pixel.

If "histo[pos+shift]" is smaller than "th" in step S76, the number of black pixels in the portion which is lower than the position corresponding to the maximum value is recognized to decrease, and "lineokflag2" is set to "1" (step S81). Accordingly, "lineokflag2=1" indicates that the result of the checking in the lower portion is "OK".

Figure 47:
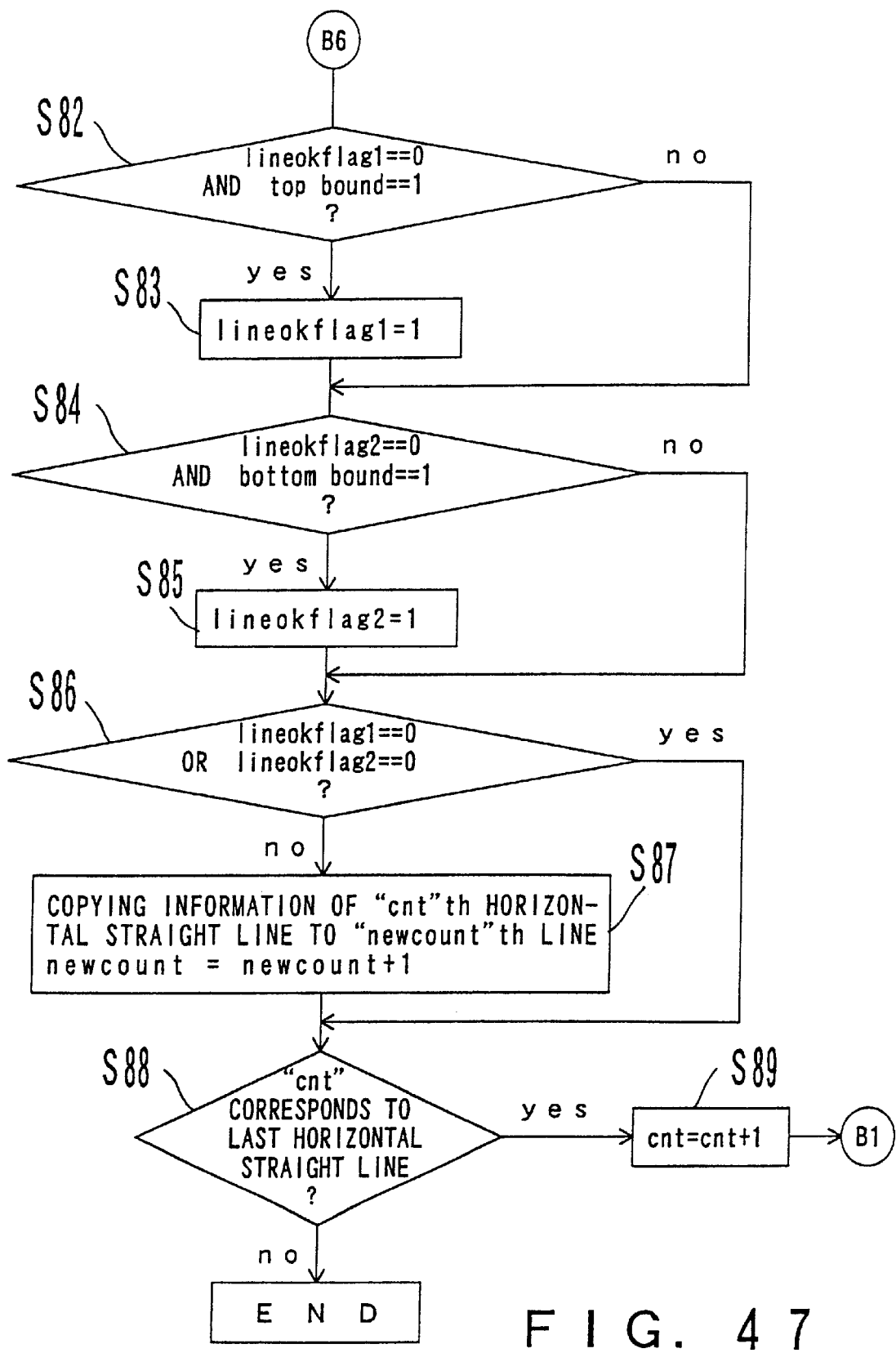
FIG. 47 is a flowchart 6 showing the process for checking/deleting a straight line.

Then, the values of "lineokflag1" and "top_bound" are examined (step S82 of FIG. 47). If the value of "lineokflag1" is "0" and at the same time, the value of "top_bound" is "1", the "cnt"th horizontal straight line to be targeted is recognized to correspond to a horizontal ruled line close to the top of the image, and "lineokflag1" is set to "1" (step S83).

Next, the values of "lineofkflag2" and "bottom_bound" are examined (step S84). If the values of "lineokflag2" and "bottom_bound" are respectively "0" and "1", the "cnt"th horizontal straight line is recognized to correspond to a horizontal ruled line close to the bottom of the image, and "lineokflag2" is set to "1" (step S85).

Then, the final values of "lineokflag1" and "lineokflag2" are examined (step S86). If the values of both "lineokflag1" and "lineokflag2" are "1", the "cnt"th horizontal straight line is determined to be a correct ruled line. Its straight line information is copied as the information of the "newcount"th ruled line, and "newcount" is incremented by "1" (step S87).

Furthermore, if "lineokflag1" or "lineokflag2" is "0", the "cnt"th horizontal straight line is not determined to be a correct ruled line, and its straight line information is not stored as the ruled line information.

Next, it is determined whether or not "cnt" corresponds to the last horizontal straight line in the image (step S88). If any horizontal straight line is left, "cnt" is incremented by "1" (step S89), and the process in and after S42 is then repeated for the next horizontal straight line. When "cnt" reaches the value corresponding to the last horizontal straight line, the process is terminated.

With such a process, the degree of likeliness of a ruled line is checked based on the comparison between the number of black pixels included in a straight line and the number of black pixels around the line, thereby efficiently deleting a straight line which is erroneously extracted from a shaded portion or a defaced character string, etc. A similar checking/deleting process is performed for a vertical straight line.

As described above, a ruled line can be correctly extracted even if an image is vague or clear, even if an image of a table includes solid and dotted lines, or even if a ruled line touches a shaded portion or a character, according to this embodiment.

The ruled line extracting technique according to the present invention is applied not only to an electronic filing system, but also to a technique for extracting a graphic including a symbol or a character in a broad sense from a pattern in which the graphic overlaps a straight line. For example, this technique can be applied to a handwritten character recognition apparatus, printed character recognition apparatus, extraction of a pattern such as a character, symbol, etc. for drawing recognition, and a separation between a ruled line and a touching portion such as an object, graphic, character, etc.

Additionally, the shape of a region representing a straight line or a segment is not necessarily a rectangle. The region of an arbitrary shape, which is surrounded by a straight line or a curved line, may be used. In this case, the process similar to that of FIG. 2B can be performed if the position, height, and the width of a straight line or a segment, and the distance between straight lines or segments, etc. are suitably defined.

According to the present invention, a ruled line portion can be correctly extracted from a normal document image whose ruled line structure cannot be predicted in advance.

For example, even if a shaded portion is included in a table, it becomes possible to correctly extract a ruled line from its image. Additionally, even if a character touches a ruled line and the information of the structure of a table is not known beforehand, a ruled line can be correctly extracted. Furthermore, even if a character is printed somewhat defaced, or even if characters are printed with high density, the probability of erroneously extracting a ruled line from a character string becomes lower.

What is claimed is:

1. A ruled line extracting apparatus, comprising:

segment extracting means for extracting information of one or more segment patterns from an input image;

storing means for classifying the information of the one or more segment patterns into information of a large segment pattern and information of a small segment pattern; and straight line extracting means for examining a link state of the one or more segment, patterns, and when a large segment pattern is linked to small segment patterns, extracting a straight line pattern composed of the small segment patterns regardless of a size of the large segment pattern.

2. A ruled line extracting apparatus, comprising:

a segment extracting unit extracting black pixel concatenation regions from an input image and extracting one or more segment patterns using the black pixel concatenation regions;

a straight line extracting unit extracting information of one or more straight line patterns each of which includes the extracted segment patterns; and a straight line integrating unit integrating two straight line patterns included in the one or more straight line patterns if the two straight line patterns overlap and a size of a non-overlapping portion of one of the two straight lines is within a particular value.

3. A ruled line extracting apparatus, comprising:

a segment extracting unit extracting black pixel concatenation regions from an input image and extracting one or more segment patterns using the black pixel concatenation regions;

a straight line extracting unit extracting information of one or more straight line patterns each of which includes the extracted segment patterns; and a straight line integrating unit recognizing a straight line pattern after integration as a ruled line candidate, if a size of the straight line pattern generated by integrating two straight line patterns which partially overlap among the one or more straight line patterns, is equal to or lower than a threshold value.

4. A computer-readable storage medium, when used by a computer, to direct the computer to perform the functions of:

extracting information of one or more segment patterns from an input image;

classifying the information of the one or more segment patterns into information of a large segment pattern and information of a small segment pattern; and examining a link state of one or more segment patterns, and when a large segment pattern is linked to small segment patterns, extracting a straight line pattern composed of the small segment patterns regardless of a size of the large segment pattern.

5. A computer-readable storage medium, when used by a computer, to direct the computer to perform the functions of:

extracting black pixel concatenation regions from an input image and extracting one or more segment patterns using the black pixel concatenation regions;

extracting information of one or more straight line patterns each of which includes the extracted segment patterns; and integrating two straight line patterns included in the one or more straight line patterns into one, if the two straight line patterns overlap and a size of a non-overlapping portion of one of the two straight lines is within a particular value.

6. A computer-readable storage medium, when used by a computer, to direct the computer to perform the functions of:

extracting black pixel concatenation regions from an input image and extracting one or more segment patterns using the black pixel concatenation regions;

extracting information of one or more straight line patterns each of which includes the extracted segment patterns; and recognizing a straight line pattern after integration as a ruled line candidate, if a size of the straight line pattern generated by integrating two straight line patterns which partially overlap among the one or more straight line patterns is equal to or lower than a threshold value.

7. A ruled line extracting method, comprising the steps of:

extracting information of one or more segment patterns from an input image;

classifying the information of the one or more segment patterns into information of a large segment pattern and information of a small segment pattern; and examining a link state of one or more segment patterns, and when a large segment pattern is linked to small segment patterns, extracting a straight line pattern composed of the small segment patterns regardless of a size of the large segment pattern.

8. A ruled line extracting method, comprising the steps of:

extracting black pixel concatenation regions from an input image and extracting one or more segment patterns using the black pixel concatenation regions;

extracting information of one or more straight line patterns each of which includes the extracted segment patterns; and integrating two straight line patterns included in the one or more straight line patterns, if the two straight line patterns overlap and a size of a non-overlapping portion of one of the two straight lines is within a particular value.

9. A ruled line extracting method, comprising the steps of:

extracting black pixel concatenation regions from an input image and extracting one or more segment patterns using the black pixel concatenation regions;

extracting information of one or more straight line patterns each of which includes the extracted segment patterns;

recognizing a straight line pattern after integration as a ruled line candidate, if a size of the straight line pattern generated by integrating two straight line patterns which partially overlap among the one or more straight line patterns, is equal to or lower than a threshold value.

10. A ruled line extracting apparatus, comprising:

a segment extracting unit extracting at least one black pixel concatenation region from an input image and extracting at least one segment pattern using the black pixel concatenation region; and a straight line integrating unit integrating at least two straight line patterns included the extracted segment pattern if the two straight line patterns overlap and a size of a non-overlapping portion of one of the two straight lines is within a threshold, wherein the straight line integrating unit integrates the straight line patterns after the segment extracting unit extracts the black pixel concatenation region.

* * * * *

UNITED STATES PATENT AND TRADEMARK OFFICE
CERTIFICATE OF CORRECTION

PATENT NO. : 6,917,706 B2 Page 1 of 1
APPLICATION NO. : 09/755030
DATED : July 12, 2005
INVENTOR(S) : Yutaka Katsuyama It is certified that error appears in the above-identified patent and that said Letters Patent is hereby corrected as shown below:

On the title page, column 2, item (56), References Cited, Other Publications, delete the entire line "A. Yu, "A Generic System for Form Dropout", IEEE, vol. 18, No. 11, Nov. 1996, pp. 1127-1134."

On the cover page, column 2, item (56), References Cited, Other Publications, insert --A. PIZANO," Business Form Recognition System", IEEE, pgs. 626-632, 1991--

Column 28, line 57, change "included" to --including--

Signed and Sealed this

Seventh Day of November, 2006

JON W. DUDAS
*Director of the United States Patent and Trademark Office*